(12) United States Patent
Kim et al.

(10) Patent No.: US 9,907,027 B2
(45) Date of Patent: Feb. 27, 2018

(54) INTERFERENCE-AWARE DETECTION METHOD AND APPARATUS FOR USE IN WIRELESS COMMUNICATION SYSTEM

(71) Applicant: Samsung Electronics Co., Ltd., Gyeonggi-do (KR)

(72) Inventors: Younsun Kim, Gyeonggi-do (KR); Youngbum Kim, Seoul (KR); Juho Lee, Gyeonggi-do (KR); Hyojin Lee, Gyeonggi-do (KR); Joonyoung Cho, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 14/071,124

(22) Filed: Nov. 4, 2013

(65) Prior Publication Data
US 2014/0126404 A1 May 8, 2014

(30) Foreign Application Priority Data

Nov. 2, 2012 (KR) .................. 10-2012-0123349

(51) Int. Cl.
*H04W 52/24* (2009.01)
*H04L 1/00* (2006.01)
(Continued)

(52) U.S. Cl.
CPC ............ *H04W 52/243* (2013.01); *H04L 1/00* (2013.01); *H04W 48/00* (2013.01); *H04B 17/345* (2015.01); *H04W 88/08* (2013.01)

(58) Field of Classification Search
None
See application file for complete search history.

(56) References Cited

U.S. PATENT DOCUMENTS 8,593,976 B2   11/2013  Kishlgaml et al.
2010/0157924 A1*  6/2010  Prasad et al. ............... 370/329
(Continued)

FOREIGN PATENT DOCUMENTS

CN    101630966    1/2010
CN    101707511    5/2010
(Continued)

OTHER PUBLICATIONS

Pantech, "DMRS Indicator of DL Signalling for Non-transparent MU-MIMO", R1-100991, 3GPP TSG-RAN WG1 #60, Feb. 22-26, 2010.
(Continued)

*Primary Examiner* — Donald Mills
(74) *Attorney, Agent, or Firm* — The Farrell Law Firm, P.C.

(57) ABSTRACT

Methods and apparatus are provided for transmitting and receiving control information, for interference detection by a User Equipment (UE), in a wireless communication system. A base station determines whether the UE supports interference-aware detection. When the UE supports interference-aware detection, the control information is generated that includes interference signal modulation scheme information and demodulation reference signal measurement information. The control information is transmitted to the UE. The interference at the UE is measured based on the received control information.

28 Claims, 20 Drawing Sheets

(51) Int. Cl.
*H04W 48/00* (2009.01)
*H04W 88/08* (2009.01)
*H04B 17/345* (2015.01)

(56) References Cited

U.S. PATENT DOCUMENTS

| | | |
|---|---|---|
| 2010/0303034 A1 | 12/2010 | Chen et al. |
| 2010/0323709 A1 | 12/2010 | Nam et al. |
| 2011/0158211 A1 | 6/2011 | Gaal et al. |
| 2012/0076028 A1* | 3/2012 | Ko et al. ............... 370/252 |
| 2012/0134338 A1 | 5/2012 | Ko et al. |
| 2013/0034070 A1* | 2/2013 | Seo ............... H04B 7/155 370/329 |
| 2013/0089040 A1* | 4/2013 | Tabet ............... H04L 5/0073 370/329 |
| 2014/0018115 A1* | 1/2014 | Zhuang ............... H04B 7/024 455/501 |
| 2014/0177585 A1* | 6/2014 | Jang et al. ............... 370/329 |
| 2014/0321313 A1* | 10/2014 | Seo et al. ............... 370/252 |
| 2015/0207600 A1* | 7/2015 | Park et al. ............ H04L 5/0048 |
| 2015/0208392 A1* | 7/2015 | Park et al. .......... H04W 23/042 |

FOREIGN PATENT DOCUMENTS

| | | |
|---|---|---|
| CN | 102195672 | 9/2011 |
| CN | 102474489 | 5/2012 |
| JP | 2006-238423 | 9/2006 |
| WO | WO 2011/099811 | 8/2011 |
| WO | WO 2012/148207 | 11/2012 |

OTHER PUBLICATIONS

Renesas Mobile Europe Ltd., "Interference Aware Receiver Modeling at System Level", R1-112311, 3GPP TSG-RAN WG1 Meeting #66, Aug. 22-26, 2011.
European Search Report dated May 17, 2016 issued in counterpart application No. 13852328.7-1855, 6 pages.
Chinese Office Action dated Apr. 18, 2017 issued in counterpart application No. 201380057623.6, 13 pages.
Marvell, "DM-RS Design Considerations for CoMP", R1-120391, 3GPP TSG-RAN WG1 #68, Feb. 6-10, 2012, 3 pages.
Japanese Office Action dated Nov. 20, 2017 issued in counterpart application No. 2015-541679, 8 pages.

* cited by examiner

FIG. 10
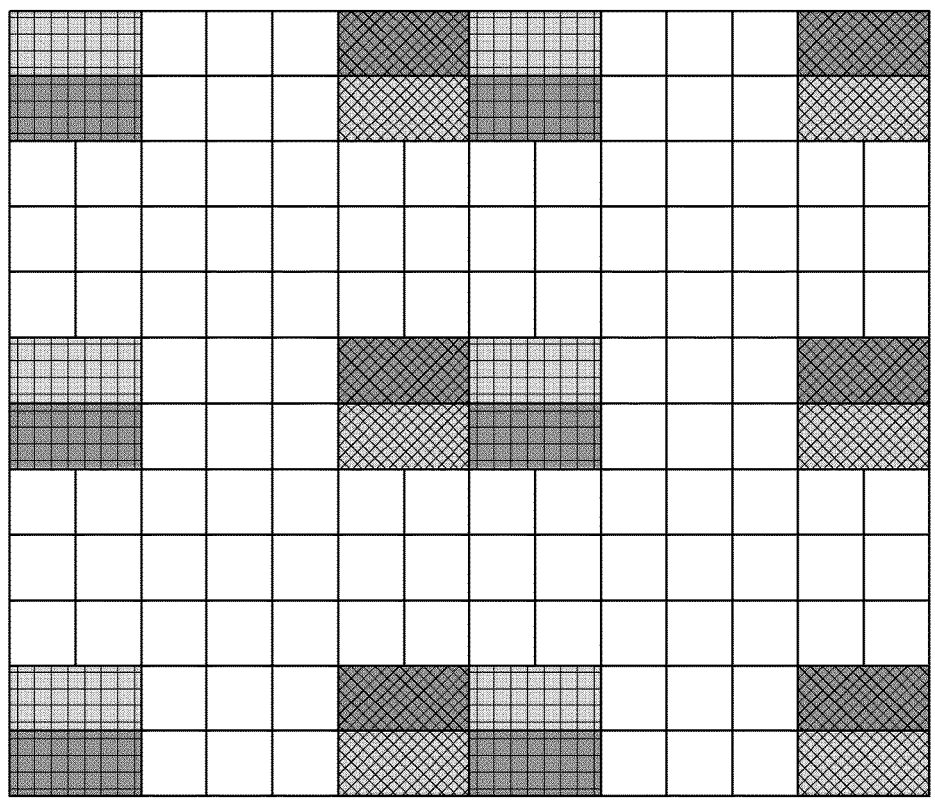
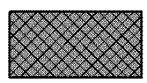 DMRS Resource 0
 DMRS Resource 2
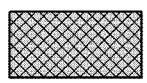 DMRS Resource 1
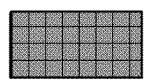 DMRS Resource 3

FIG. 13
DMRS Resource Size: 1
UE Assigned DMRS Resource 0
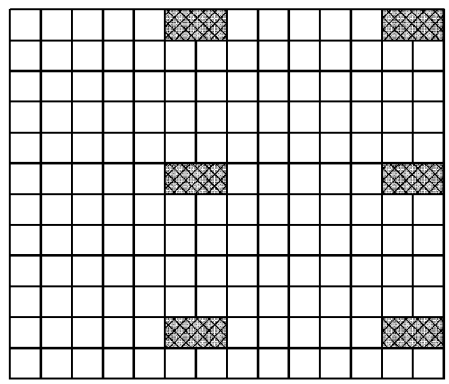
DMRS Resource Size: 2
UE Assigned DMRS Resource 0
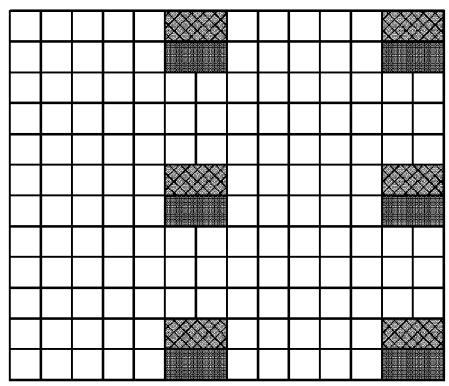
DMRS Resource Size: 2
UE Assigned DMRS Resource 1
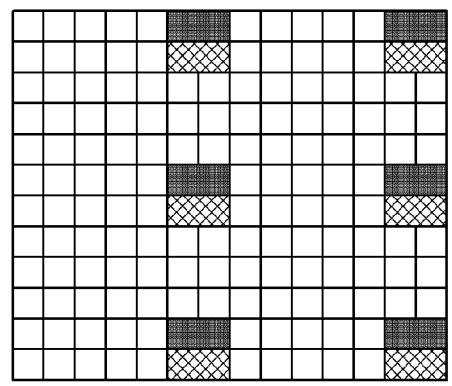
DMRS Resource Size: 2
UE Assigned DMRS Resource 0 and 1
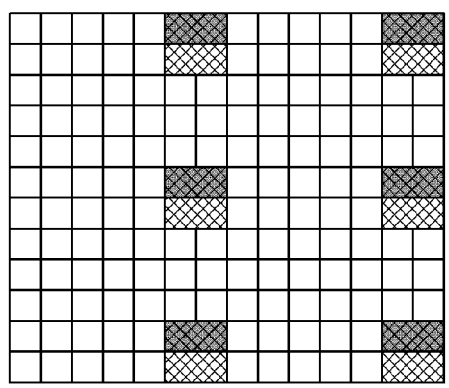
☐ PDSCH, control channel, or CRS RE
▨ Unused REs
▨ DMRS Resource 0
▨ DMRS Resource 1

FIG. 14

DMRS Resource Size: 4
UE Assigned DMRS Resource 0

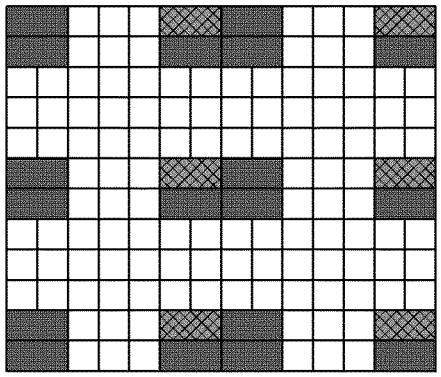

DMRS Resource Size: 4
UE Assigned DMRS Resource 1

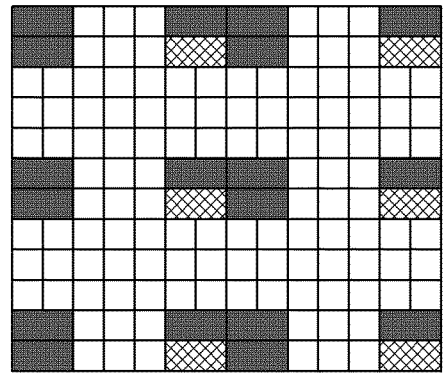

DMRS Resource Size: 4
UE Assigned DMRS Resource 2

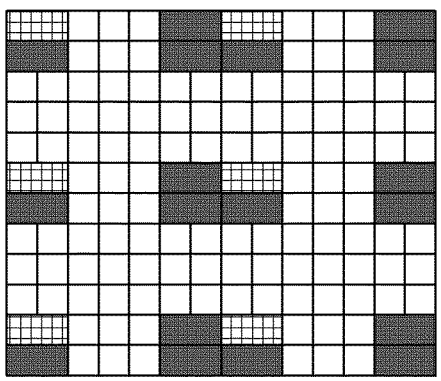

DMRS Resource Size: 4
UE Assigned DMRS Resource 3

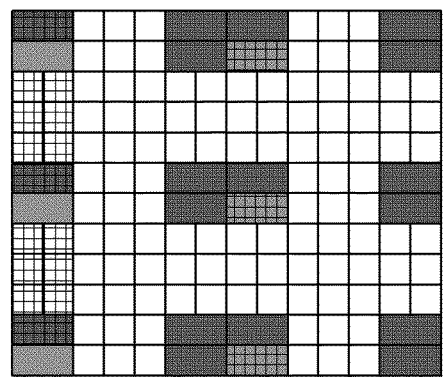

DMRS Resource Size: 4
UE Assigned DMRS Resource 0 and 1

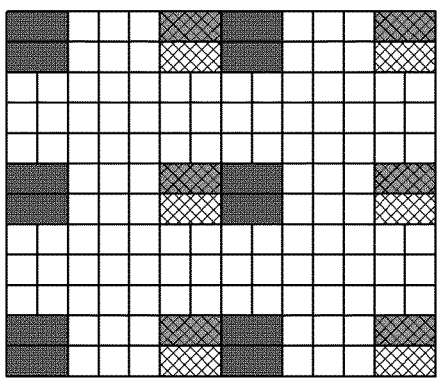

DMRS Resource Size: 4
UE Assigned DMRS Resource 2 and 3

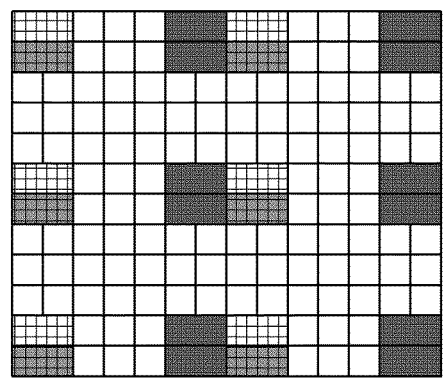

☐ PDSCH, control channel, or CRS RE    ▨ DMRS Resource 0    ▦ DMRS Resource 2

■ Unused REs    ▨ DMRS Resource 1    ▦ DMRS Resource 3

INTERFERENCE-AWARE DETECTION
METHOD AND APPARATUS FOR USE IN
WIRELESS COMMUNICATION SYSTEM

PRIORITY

This application claims priority under 35 U.S.C. § 119(a) to an application filed in the Korean Intellectual Property Office on Nov. 2, 2012, and assigned Serial No. 10-2012-0123349, the content of which is incorporated herein by reference.

BACKGROUND

1. Field of the Invention

The present invention relates generally to a wireless communication system and, more particularly, to an interference-aware detection method and apparatus for a User Equipment (UE) in a wireless communication system.

2. Description of the Related Art

Mobile communication systems have evolved into high-speed, high-quality wireless packet data communication systems that provide data and multimedia services beyond those of early voice-oriented services. Various mobile communication standards, such as, for example, High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in Institute of Electrical and Electronics Engineers (IEEE), have been developed to support the high-speed, high-quality wireless packet data communication services. Particularly, LTE is a communication standard that has been developed to support high speed packet data transmission and to maximize the throughput of the radio communication system with various radio access technologies. LTE-A is an evolved version of LTE, which improves the data transmission capability.

LTE is characterized by 3GPP Release 8 or 9 Capable Base Station and Terminal (UE), while LTE-A is characterized by 3GPP Release 10 Capable Base Station and UE. As a key standardization organization, 3GPP continues standardization of a next release for more improved performance beyond LTE-A.

The existing $3^{rd}$ and $4^{th}$ Generation wireless packet data communication systems (such as HSDPA, HSUPA, HRPD, and LTE/LTE-A) adopt Adaptive Modulation and Coding (AMC) and channel-sensitive scheduling techniques to improve transmission efficiency. AMC allows the transmitter to adjust the data amount to be transmitted according to the channel condition. Specifically, the transmitter is capable of decreasing the data transmission amount for a bad channel condition so as to fix the received signal error probability at a certain level, or is capable of increasing the data transmission amount for a good channel condition so as to transmit a large amount of information efficiently while maintaining the received signal error probability at an intended level. The channel sensitive scheduling allows the transmitter to selectively serve a user having a good channel condition among a plurality of users, so as to increase the system capacity as compared to fixedly allocating a channel to serve a single user. This increase in system capacity is referred to as multi-user diversity gain. In brief, the AMC method and the channel-sensitive scheduling method receive partial channel state information that is fed back from a receiver, and apply an appropriate modulation and coding technique at the most efficient time, which is determined depending on the received partial channel state information.

Much research has been conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the process of the standardization of OFDMA-based evolved system. OFDMA is expected to provide superior system throughput as compared to the CDMA. One of the main factors that allows OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

FIG. 1 is a graph illustrating a relationship between time and frequency resources in an LTE/LTE-A system.

As shown in FIG. 1, the radio resource for transmission from the evolved Node B (eNB) to a UE is divided into Resource Blocks (RBs) in a frequency domain and subframes in a time domain. In the LTE/LTE-A system, an RB generally consists of 12 consecutive carriers and occupies 180 kHz bandwidth. A subframe consists of 14 OFDM symbols and spans 1 msec. The LTE/LTE-A system allocates resources for scheduling in subframe units in the time domain and in RB units in the frequency domain.

FIG. 2 is a time-frequency grid illustrating a single resource block of a downlink subframe as a smallest scheduling unit in the LTE/LTE-A system.

As shown in FIG. 2, the radio resource is of one subframe in the time domain and one RB in the frequency domain. The radio resource consists of 12 subcarriers in the frequency domain and 14 OFDM symbols in the time domain, i.e., 168 unique frequency-time positions. In LTE/LTE-A, each frequency-time position is referred to as Resource Element (RE).

The radio resource structured as shown in FIG. 2 can be used for transmitting many different types of signals, as set forth in detail below.

1. Cell-specific Reference Signal (CRS): reference signal transmitted to all the UEs within a cell
2. Demodulation Reference Signal (DMRS): reference signal transmitted to a specific UE
3. Physical Downlink Shared Channel (PDSCH): data channel transmitted in downlink, which the eNB uses to transmit data to the UE and mapped to REs not used for reference signal transmission in data region of FIG. 2
4. Channel Status Information Reference Signal (CSI-RS): reference signal transmitted to the UEs within a cell and used for channel state measurement. Multiple CSI-RSs can be transmitted within a cell.
5. Other control channels (Physical Hybrid-ARQ Indicator Channel (PHICH), Physical Control Format Indicator Channel (PCFICH), Physical Downlink Control Channel (PDCCH)): channels for providing a control channel necessary for the UE to receive PDCCH and transmitting ACK/NACK of Hybrid Automatic Repeat reQuest (HARD) operation for uplink data transmission In addition to the above signals, a zero power CSI-RS can be configured in order for UEs within corresponding cells to receive the CSI-RSs transmitted by different eNBs in the LTE-A system. The zero power CSI-RS can be mapped to positions designated for the CSI-RS, and the UE receives the traffic signal skipping the corresponding radio resource in general. In the LTE-A system, the zero power CSI-RS is referred to as muting. The zero power CSI-RS is mapped to the CSI-RS position without transmission power allocation.

In FIG. 2, the CSI-RS can be transmitted at some of the positions marked by A, B, C, D, E, F, G, H, I, and J, according to the number of number of antennas transmitting CSI-RS. Also, the zero power CSI-RS can be mapped to some of the positions A, B, C, D, E, F, G, H, I, and J. The CSI-RS can be mapped to 2, 4, or 8 REs, according to the number of the antenna ports for transmission. For two antenna ports, half of a specific pattern is used for CSI-RS transmission. For four antenna ports, the entire specific pattern is used for CSI-RS transmission. For eight antenna ports, two patterns are used for CSI-RS transmission. Meanwhile, muting is always performed by pattern. Specifically, although the muting may be applied to a plurality of patterns, if the muting positions mismatch CSI-RS positions, it cannot be applied to one pattern partially.

In a cellular system, the reference signal must be transmitted for downlink channel state measurement. In the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise, which are important in determining the downlink channel condition. For example, when the eNB with one transmit antenna transmits the reference signal to the UE with one receive antenna, the UE must determine energy per symbol that can be received in downlink and an interference amount that may be received for the duration of receiving the corresponding symbol to calculate Es/Io from the received reference signal. The calculated Es/Io is reported to the eNB such that the eNB determines the downlink data rate for the UE.

In a typical mobile communication system, the base station apparatus is positioned at the center of each cell and communicates with the UE using one or a plurality of antennas deployed at a restricted position. Such a mobile communication system, implemented with the antennas deployed at the same position within the cell, is referred to as a Centralized Antenna System (CAS). In contrast, the mobile communication system implemented with a plurality of Remote Radio Heads (RRHs), belonging to a cell and distributed within the cell area, is referred to as Distributed Antenna System (DAS).

FIG. 3 is a diagram illustrating an antenna arrangement in a conventional distributed antenna system.

FIG. 3 illustrates distributed antenna system-based cells 300 and 310. The cell 300 includes five antennas including one high power transmission antenna 320 and four low power antennas 341, 342, 344, and 343. The high power transmission antenna 320 is capable of providing at least a minimum service within the coverage area of the cell while the low power antennas 341, 342, 343, and 344 are capable of providing UEs with the high data rate service within a restricted area. The low and high power transmission antennas are all connected to the central controller and operate in accordance with the scheduling and radio resource allocation of the central controller. In the distributed antenna system, one or more antennas may be deployed at one geometrically separated antenna position. In the distributed antenna system, the antenna(s) deployed at the same position is referred to as a Remote Radio Head (RRH).

In the distributed antenna system of FIG. 3, the UE receives signals from one geometrically distributed antenna group and regards the signals from other antenna groups as interference.

FIG. 4 is a diagram illustrating interference between antenna groups transmitting to different UEs in the distributed antenna system.

In FIG. 4, a UE1 400 is receiving traffic signal from an antenna group 410. A UE2 420, a UE3 440, and a UE4 460 are receiving traffic signals from antenna groups 430, 450, and 470, respectively. The UE1 400, which is receiving the traffic signal from the antenna group 410, is influenced by the interference of the other antenna groups transmitting traffic signals to other UEs. Specifically, the signals transmitted from the antenna groups 430, 450, and 470 cause interferences to UE1 400.

Typically, in the distributed antenna system, the interferences caused by other antenna groups are classified into two categories:

Inter-cell interference: interference caused by antenna groups of other cells

Intra-cell interference: interference caused by antenna groups of same cell

In FIG. 4, the UE 1 400 undergoes intra-cell interference from the antenna group 430 of the same cell and inter-cell interference from the antenna groups 450 and 470 of a neighbor cell. The inter-cell interference and the intra-call interference influence the data channel reception of the UE.

Typically, the radio signal received by a UE includes noise and interference. Accordingly, the received signal may be expressed as set forth in Equation (1) below.

$$r = s + \text{noise} + \text{interfernee} \quad (1)$$

In Equation (1), 'r' denotes the received signal, 's' denotes the transmitted signal, 'noise' denotes the Gaussian distributed noise, and 'interference' denotes the interference signal occurring in radio communication. The interference may occur in the following situations.

Interference at serving Transmission Point: When one Transmission Point performs MU-MIMO transmission using a plurality of antennas, the signals addressed to different users may interfere to each other.

Interference from other Transmission Points: The signals transmitted by neighbor cells or neighbor antennas in the distributed antenna system may cause interference to the desired signal.

A Signal to Interference and Noise Ratio (SINR) varies depending on the size of interference and, as a consequence, affects the reception performance. Typically, the interference is one of the key factors degrading the system throughput of the cellular mobile communication system, and the system throughput is dependent on how to control the interference. In LTE/LTE-A, various technologies are introduced to control interference in association with Coordinated Multi-Point Transmission and Reception (CoMP) as a promised cooperative communication technology. In CoMP, the network integrally controls the transmission of the eNBs and/or transmission points to determine size and presence/absence of interference in downlink and uplink. When two eNBs exist, the central controller of the network may control a second eNB to suspend signal transmission in order to avoid interfering the signal transmitted from a first eNB to the UE.

In the wireless communication system, the error correction code is used to correct an error occurring in transmitting/receiving signals. In the LTE/LTE-A system, convolution code and turbo code are used for error correction encoding. In order to improve the decoding performance of error correction encoding, the receiver performs soft-decision decoding rather than hard-decision decoding when demodulating the symbols modulated with Quadrature Phase Shift Keying (QPSK), 16Quadrature Amplitude Modulation (QAM), and 64QAM. When the sender transmits '+1' or '−1', the hard-decision receiver selects one of '+1' and '−1' to be output. In contrast, the soft-decision receiver outputs the information on whether the received signal is '+1' or '−1' and reliability of the decision. This reliability information can be used for improving decoding performance in the decoding procedure.

Typically, the hard-decision receiver uses Log Likelihood Ratio (LLR) to calculate the output value. When a Binary Phase Shift Keying (BPSK) modulation scheme has a transmission signal that is one of '+1' and '−1', LLR is defined as set forth in Equation (2) below.

$$LLR = \log \frac{f(r \mid s = +1)}{f(r \mid s = -1)} \quad (2)$$

In Equation (2), 'r' denotes the received signal, and 's' denotes the transmitted signal. The conditional probability density function $f(r|s=+1)$ is the probability density function of the received signal under the condition that the transmitted signal is '+1'. Likewise, the conditional probability density function $f(r|s=-1)$ is the probability density function of the received signal under the condition that the transmitted signal is '−1'. The LLR can be expressed mathematically in a similar manner even in QPSK, 16QAM, and 64QAM modulation schemes. Typically, the conditional probability density function is used to calculate LLR under the assumption of Gaussian distribution.

FIG. 5 is a diagram illustrating a graph of the conditional probability density function having the Gaussian distribution.

In FIG. 5, reference number 500 denotes the conditional probability density function $f(r|s=-1)$ curve, and reference number 510 denotes the conditional probability density function $f(r|s=+1)$. When the received signal value calculated with the conditional probability density function is determined as denoted by reference number 520, the receiver calculates LLR as log(f2/f1). The conditional probability density function of FIG. 5 corresponds to the case where the noise and interference follow the Gaussian distribution.

In the mobile communication system such as LTE/LTE-A, the eNB transmits a few dozen bits of information to the UE at a time through PDSCH. The eNB encodes the information to be transmitted to the UE, modulates the encoded information in a modulation scheme such as QPSK, 16QAM, and 64QAM, and transmits the modulated signal. If PDSCH is received, the UE generates LLRs for a few dozen encoded symbols to the decoder in demodulating the a few dozen modulation symbols.

Typically, the noise follows Gaussian distribution, but the interference may not follow Gaussian distribution. The reason that the interference does not follow the Gaussian distribution is because the interference is the radio signal addressed to other receivers, unlike the noise. Specifically, since the 'interference' in Equation (1) is the radio signal addressed to another receiver, the modulation scheme, such as BPSK, QPSK, 16QAM, and 64QAM, is applied for transmission. When the interference signal is modulated with BPSK, the interference has the probability distribution having '+k' or '−k' value at the same probability. Here, 'k' denotes a value determined depending on the signal strength attenuation effect of the radio channel.

FIG. 6 is a diagram illustrating a graph of the conditional probability density function under the assumption that the interference signal is modulated in BPSK modulation scheme in the situation that the received signal is modulated with BPSK. In FIG. 6, it is assumed that the noise follows the Gaussian distribution.

The conditional probability density function of FIG. 6 may be used to observe the function different from the conditional probability density function of FIG. 5. In FIG. 6, reference number 620 denotes the conditional probability density function $f(r|s=-1)$ curve, and reference number 630 denotes the conditional probability density function $f(r|s=+1)$ curve.

Reference number 610 is a size determined according to the signal strength of the interference signal and affected by the radio channel influence. When the received signal value is represented by the conditional probability density function curve 600, the receiver calculates the LLR as log(f4/f3). Since a different conditional probability density function is used, this value differs from the LLR value of FIG. 5. Specifically, the LLR acquired in consideration of the modulation scheme of the interference signal differs from the LLR calculated under the assumption that the interference is Gaussian-distributed.

FIG. 7 is a diagram illustrating a graph of the conditional probability density function under the assumption that the interference signal is modulated in 16QAM modulation scheme while the received signal is modulated in BPSK modulation scheme.

FIG. 7 shows that the conditional probability density function varies according to the modulation scheme applied to the interference signal. In FIG. 7, reference number 700 denotes the conditional probability density function $f(r|s=-1)$ curve, and reference number 710 denotes the conditional probability density function $f(r|s=+1)$. Although the received signals are modulated with BPSK in FIGS. 6 and 7, the interference signal is modulated with BPSK in FIG. 6 and 16QAM in FIG. 7. Specifically, although the same modulation scheme is applied to the received signal, the conditional probability density function changes depending on the modulation scheme applied to the interference signal, and thus the calculated LLR changes too.

As described with reference to FIGS. 5, 6, and 7, LLR has a different value depending on the interference assumed by the receiver. In order to optimize the reception performance, it is necessary to calculate the LLR using the conditional probability density function reflecting the statistical characteristic of the interference in a real situation. Specifically, when the interference signal is modulated in a BPSK modulation scheme, the receiver has to calculate LLR under the assumption that the interference signal has been modulated in BPSK. If the receiver assumes a Gaussian distribution or 16QAM modulation scheme for processing the interference signal modulated in BPSK, a non-optimized LLR value is calculated, resulting in degradation of reception performance.

SUMMARY OF THE INVENTION

The present invention has been made to address at least the above problems and/or disadvantages and to provide at least the advantages described below. Accordingly, an aspect of the present invention provides a method and an apparatus for transmitting interference control information that is capable of improving reception performance of the UE in the LTE-A system.

In accordance with an aspect of the present invention, a method is provided for transmitting control information, for interference detection by a UE, in base station of a wireless communication system. It is determined whether the UE supports interference-aware detection. When the UE supports interference-aware detection, the control information is generated that includes interference signal modulation scheme information and demodulation reference signal measurement information. The control information is transmitted to the UE.

In accordance with another aspect of the present invention, a base station is provided for transmitting control information for a UE to detect interference in a wireless communication system. The base station includes a transceiver configured to transmit and receive signals to and from the UE. The base station also includes a controller configured to determine whether the UE supports interference-aware detection, generate the control information including interference signal modulation scheme information and demodulation reference signal measurement information when the UE supports interference-aware detection, and control the transceiver to transmits the control information to the UE.

In accordance with another aspect of the present invention, a method is provided for receiving control information for detecting interference in a UE of a wireless communication system. A base station is notified as to whether the UE supports interference-aware detection. When the UE supports interference-aware detection, the control information including interference signal modulation scheme information and demodulation reference signal measurement information is received. The interference at the UE is measured based on the received control information.

In accordance with still another aspect of the present invention, a UE is provided for receiving control information from a base station in a wireless communication system. The UE includes a transceiver configured to transmit and receive signals to and from the base station. The UE also includes a controller configured to notify a base station as to whether the UE supports interference-aware detection, receive the control information including interference signal modulation scheme information and demodulation reference signal measurement information when the UE supports interference-aware detection, and measure the interference at the UE based on the received control information.

BRIEF DESCRIPTION OF THE DRAWINGS

The above and other aspects, features, and advantages of the present invention will be more apparent from the following detailed description when taken in conjunction with the accompanying drawings, in which:

FIG. 10 is a diagram illustrating a DMRS pattern for interference measurement and a DMRS resource in the system using a plurality of DMRS resources, according to an embodiment of the present invention;

FIG. 13 is a diagram illustrating zero-power DMRS and PDSCH reception DMRS patterns that can be allocated to the UE when up to two DMRS resources can be used, according to an embodiment of the present invention;

FIG. 14 is a diagram illustrating zero-power DMRS and PDSCH reception DMRS patterns that can be allocated to the UE when up to 4 DMRS resources can be used, according to an embodiment of the present invention;

DETAILED DESCRIPTION OF EMBODIMENTS OF THE PRESENT INVENTION

Figure 1:
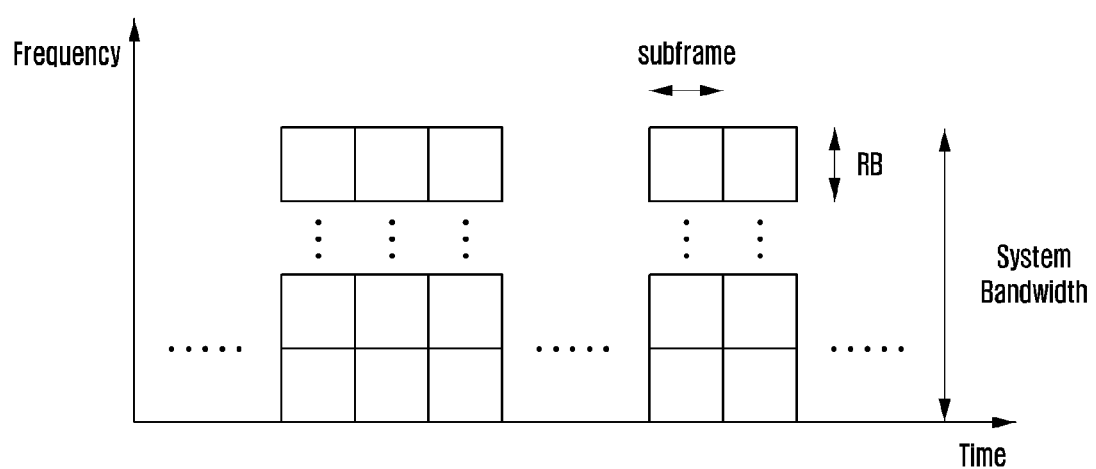
FIG. 1 is a graph illustrating a relationship between time and frequency resources in LTE/LTE-A system.
Figure 2:
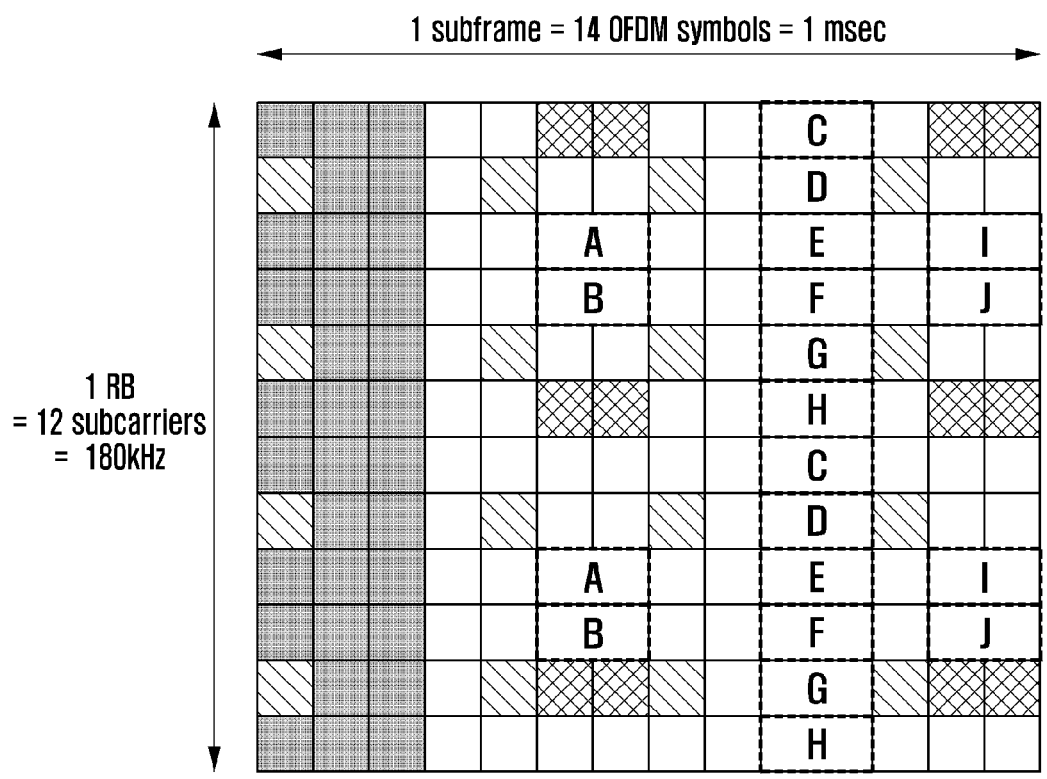
FIG. 2 is a time-frequency grid illustrating a single resource block of a downlink subframe as a smallest scheduling unit in the LTE/LTE-A system.
Figure 3:
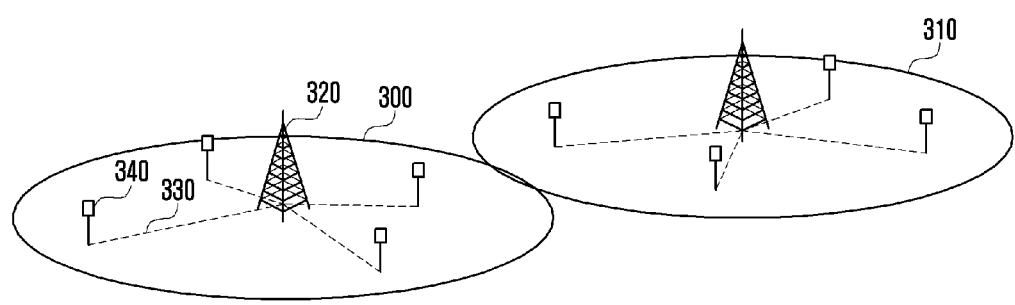
FIG. 3 is a diagram illustrating an antenna arrangement in a distributed antenna system.
Figure 4:
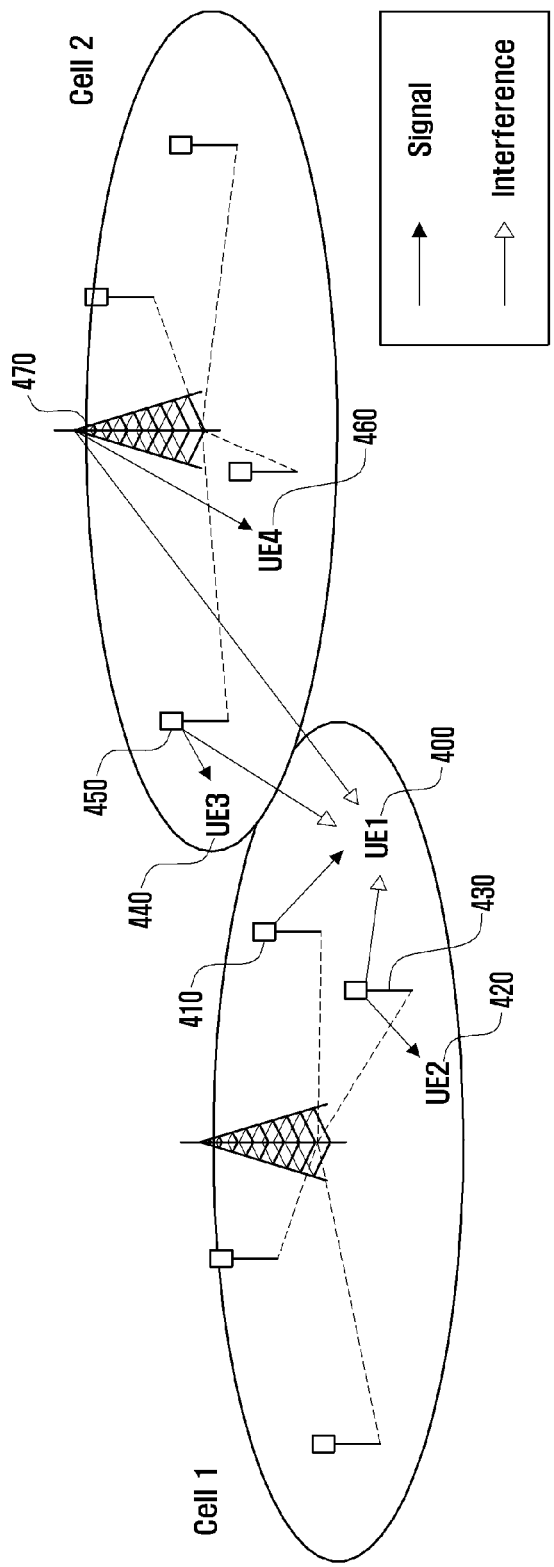
FIG. 4 is a diagram illustrating interference between antenna groups transmitting different UEs in a distributed antenna system.
Figure 5:
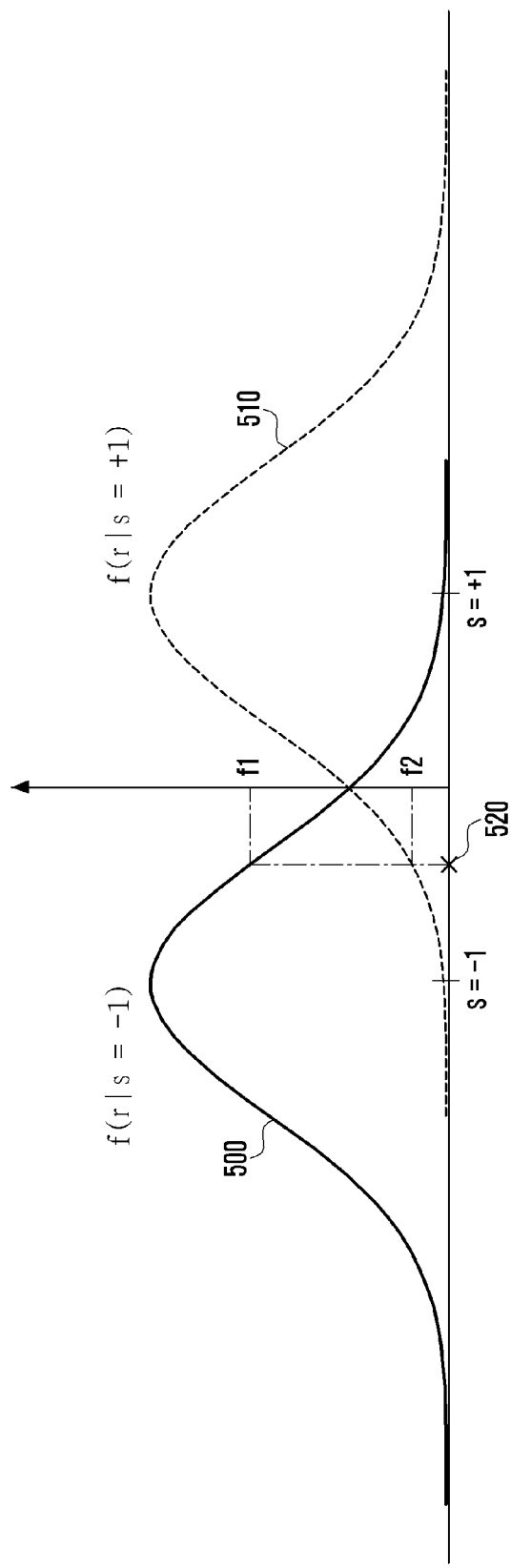
FIG. 5 is a graph of a conditional probability density function having a Gaussian distribution.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the description is directed to the OFDM-based radio communication system, particularly the 3GPP Evolved Universal Mobile Telecommunications System (UMTS) Terrestrial Radio Access (EUTRA), it will be understood by those skilled in the art that embodiments of the present invention can be applied even to other communication systems having the similar technical background and channel format, with a slight modification, without departing from the spirit and scope of embodiments of the present invention.

Figure 8:
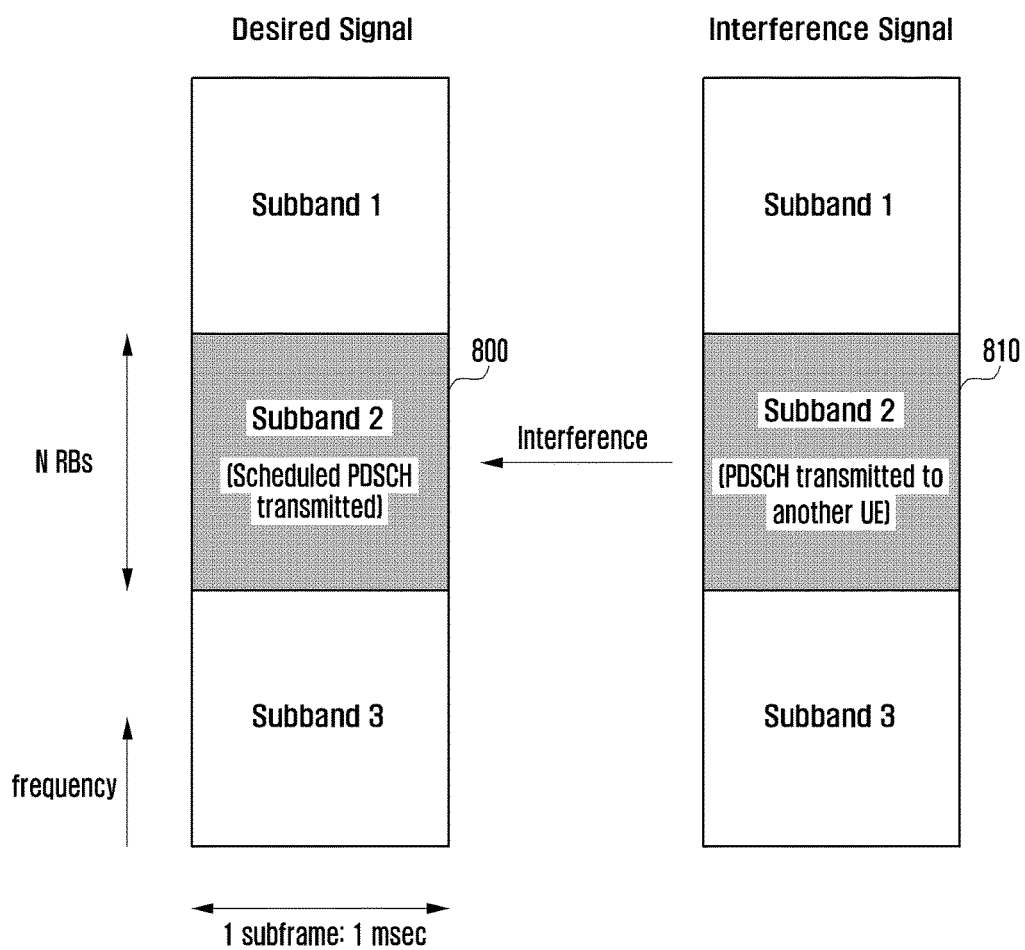
FIG. 8 is a diagram illustrating an interference occurrence signal in an LTE/LTE-A system, according to an embodiment of the present invention.

FIG. 8 is a diagram illustrating an interference occurrence signal in an LTE/LTE-A system, according to an embodiment of the present invention.

In FIG. 8, the UE receives a radio signal 800. A signal 810 addressed to another UE causes interference to the UE. In the LTE/LTE-A system, this situation occurs only when the desired signal and the interference signal are transmitted at the same subframe on the same frequency band. In FIG. 8, it is assumed that the desired signal and the interference signal are transmitted in N RBs.

Figure 6:
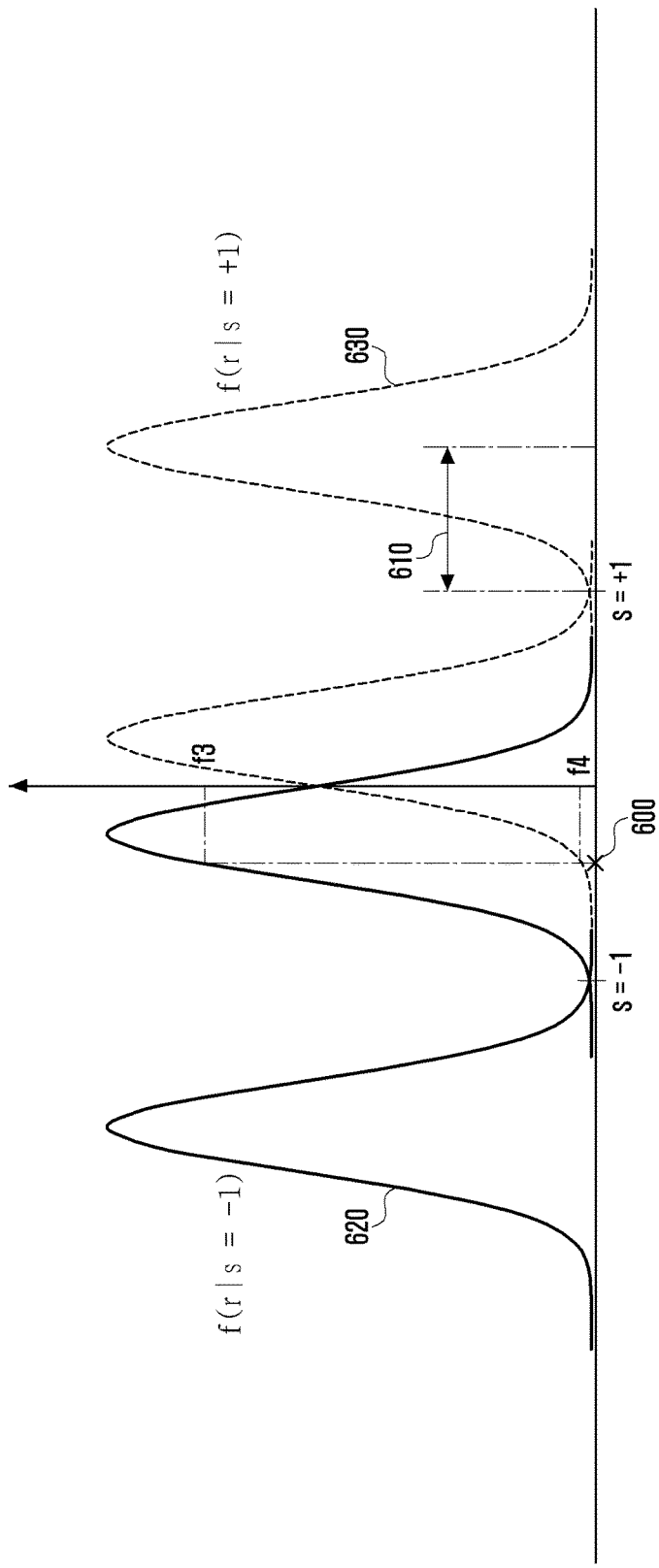
FIG. 6 is a graph of the conditional probability density function under the assumption that the interference signal is modulated in BPSK modulation scheme in the situation that the received signal is modulated with BPSK.
Figure 7:
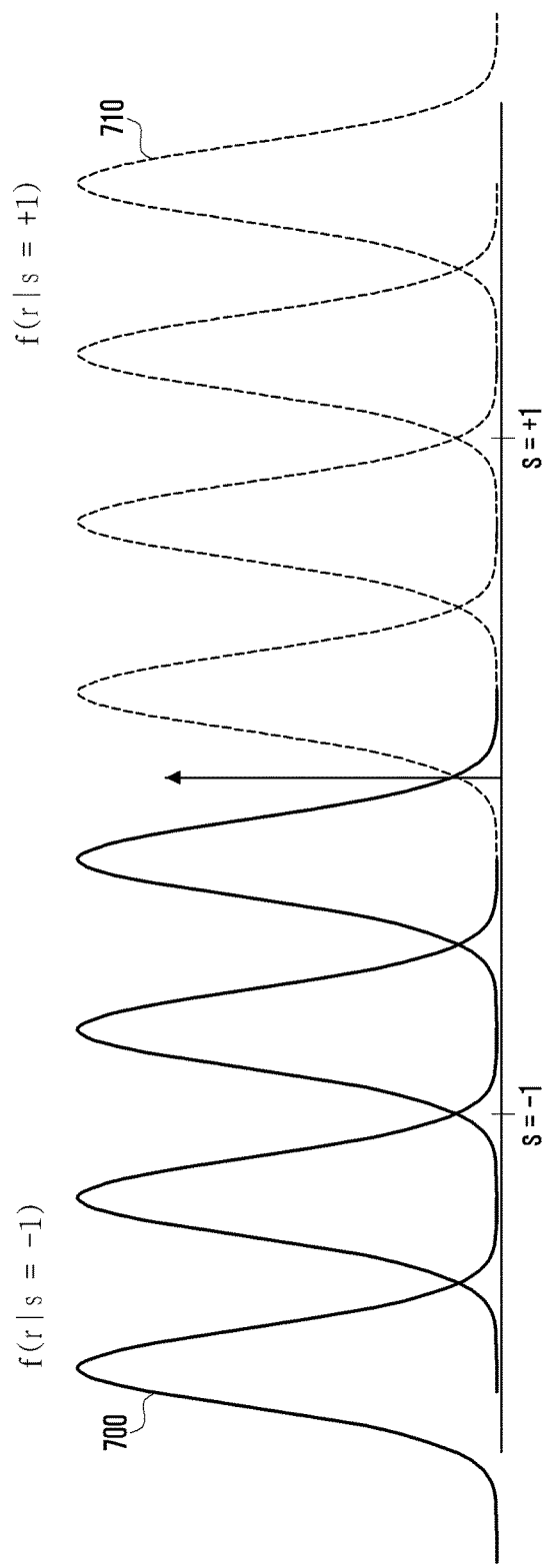
FIG. 7 is a graph of the conditional probability density function under the assumption that the interference signal is modulated in 16QAM modulation scheme while the received signal is modulated in BPSK modulation scheme.

In order to calculate optimal LLR in the process of detecting the desired signal, the UE must know the conditional probability density function to which the statistical characteristic of the interference signal 810 is reflected. The key information to acquire the conditional probability density function is the modulation scheme of the interference signal. It is also important to check the interference signal channel characteristics, including the received signal strength of the interference signal, transmitted in the corresponding modulation scheme. The interference signal channel characteristics, including the received signal strength of the interference signal, is required in order to check the value as denoted by reference number 610 of FIG. 6 and, as a consequence, to obtain the accurate conditional probability density function. Embodiments of the present invention aim to provide a method and an apparatus for checking the modulation scheme of the interference signal and the channel characteristics, including the received signal strength of the interference signal.

Generation of LLR in consideration of statistical characteristics such as, for example, the conditional probability density function, of the interference is referred to as IAD in embodiments of the present invention. A description is made of the method and apparatus for supporting IAD in a cellular mobile communication system.

The IAD method of embodiments of the present invention may be summarized as a procedure of generating, at the eNB, the control information including the modulation scheme of the signal causing interference to the UE, and interference measurement configuration for measuring interference and transmitting the control information to the UE. The eNB notifies the UE of the above information to make it possible for the UE to calculate an optimal LLR using the accurate conditional probability density function to which the statistical characteristics of the interference signal is applied. The optimized LLR is capable of making it possible to improve the reception performance of the soft-decision receiver. A method for transmitting the information on the modulation scheme applied to the signal causing interference to the terminal is described in greater detail below.

Embodiments of the present invention proposes control information 1 for notifying the UE of the modulation scheme of the interference signal as shown in Table 1.

TABLE 1

| 2-bit control information | Description |
| --- | --- |
| 00 | Interference signal modulated in QPSK |
| 01 | Interference signal modulated in 16QAM |
| 10 | Interference signal modulated in 64QAM |
| 11 | Non-modulated interference signal |

The control information is set to '00' to indicate that the interference signal is modulated in QPSK. The control information is set to '01' to indicate that the interference signal is modulated in 16QAM. The control information is '10' to indicate that the interference signal is modulated in 64QAM. If the control information 1 is set to '11', the UE assumes that the interference is not modulated in any modulation scheme. The eNB notifies the UE of the non-modulated interference in the following situations:

when there is no significant interference signal to the UE,
when the interference signal is not modulated in specific modulation scheme, and
when the interference signal appears at a part of the frequency band of the received signal If there is no signal causing significant interference to the UE, the neighbor eNBs are not transmitting signals. If the interference signal has no modulation scheme, there are a plurality of interferences signals having different modulation schemes in the frequency and time duration occupied by the desired signal. For example, when the UE receives PDSCH in the frequency region of RB1 and RB2, the interference signal on the RB1 may be modulated in QPSK while the interference signal on the RB2 may be modulated in 16QAM. When the interference signal exists at a part of the frequency band of the desired signal, the control information 1 is set to '11' to notify the UE that the interference signal is not modulated in a specific modulation scheme.

If the control information 1 is received, the UE may determine the modulation scheme applied to the signal causing interference to the desired signal addressed to the UE.

Figure 9:
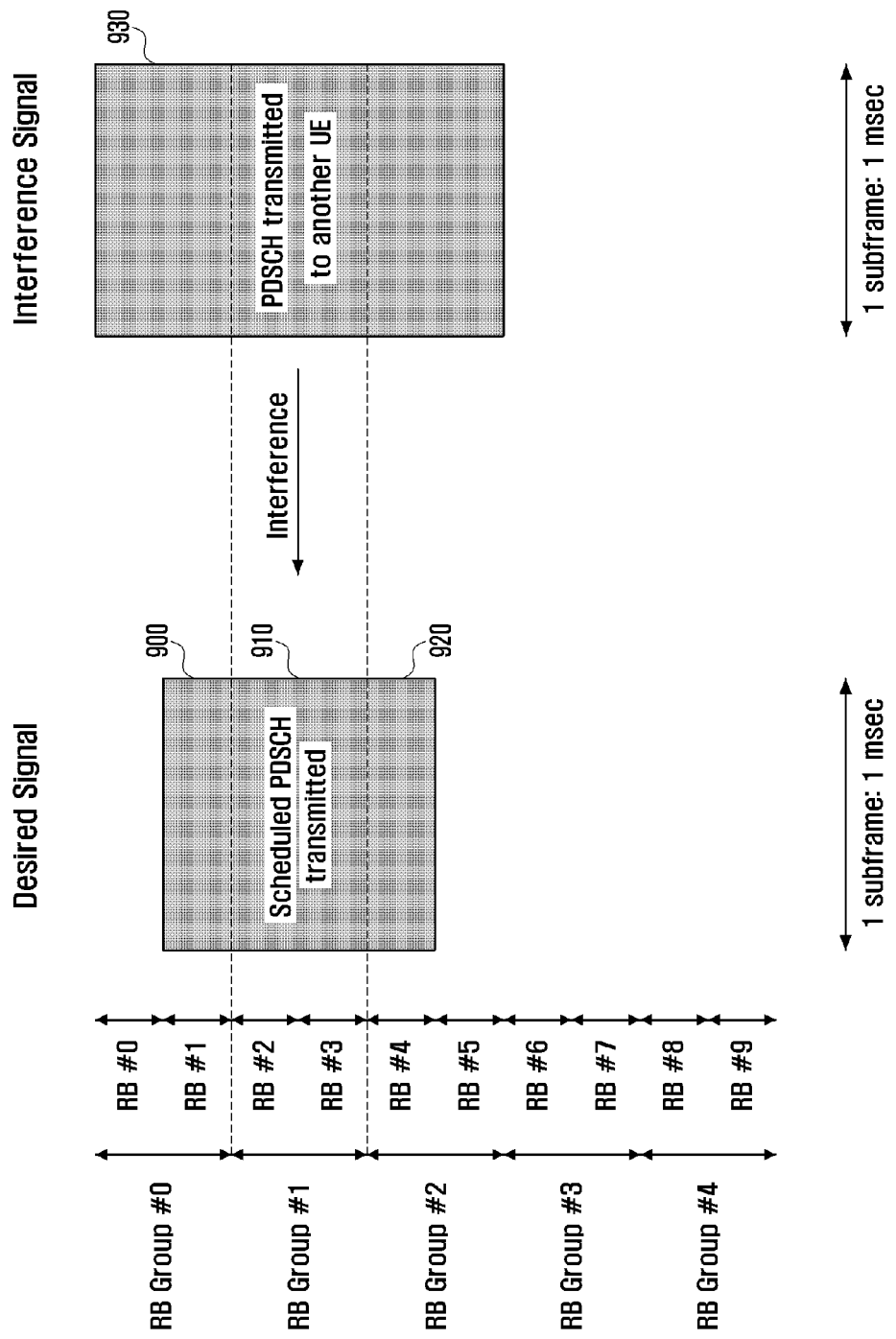
FIG. 9 is a diagram illustrating a mechanism for the UE to apply Interference-Aware Detection (IAD) using the received control information, according to an embodiment of the present invention.

FIG. 9 is a diagram illustrating a mechanism for the UE to apply IAD using the received control information 1, according to an embodiment of the present disclosure.

In FIG. 9, the UE receives PDSCH in frequency regions RB1, RB2, RB3, and RB4. A signal 930 causing interference to the desired signal is received simultaneously. If the control information 1 is received, the UE determines the modulation scheme applied to the interference signal 930 based on the control information. The UE measures the interference signals on frequency regions 900, 910, and 920 and generates LLRs for a PDSCH received on the frequency regions 900, 910, and 920. The UE measures the interference signals on the frequency regions 900, 910, and 920 and generate LLRs respectively, due to the fact that radio channels on the respective frequency regions may be different from each other due to frequency selective fading. In FIG. 9, the radio channel on the RB1 differs from the radio channel on the RB3. If the radio channels differ from each other, the statistical characteristics of the interferences become different from each other. In embodiments of the present invention, the entire system bandwidth is divided into a plurality of RB Groups (RBGs) and the interference measurement is performed per RBG to implement IAD. For example, the UE checks that the frequency regions 900, 910, and 920 on which PDSCH has transmitted belong to different RBGs and, by taking notice of this, performs interference measurements respectively when implementing IAD for generating LLR in consideration of the statistical characteristics of the interference.

A description of the method for the eNB to transmit information for use in interference measurement to the UE is described in greater detail below.

In order to implement IAD for generating LLR efficiently in consideration of the statistical characteristics of interference, accurate interference measurement is required. The UE measures the interference signal causing interference to the desired PDSCH to determine the received signal strength for use in IAD.

When there is any error in measuring interference, the IAD performance may be degraded. Embodiments of the present invention propose a method for measuring DMRS as a component of the interference signal. DMRS is the reference signal for use in UE's estimation of radio channel influence in receiving PDSCH. Specifically, the UE estimates the radio channel based on DMRS to receive PDSCH. Since the same precoding is applied to the DMRS and PDSCH, the UE may check the influence of the interference occurring to the PDSCH by measuring the DMRS. Since the same precoding is applied to the DMRS and PDSCH, the UE is capable of checking the statistical characteristics of interference to the PDSCH by measuring interference to the DMRS. In this way, the DMRS may be used for estimating interference from other eNBs as well as receiving PDSCH. That is, the UE B may measure the DMRS transmitted from the eNB to the UE A to check the interference to the desired signal, which is caused by the signal transmitted to the UE A.

Embodiments of the present invention propose a method of defining new DMRS muting and DMRS resource allocation in consideration of the DMRS structure, and notifying the UE of this for accurate interference measurement. The term 'DMRS muting' can be used interchangeably with the term 'zero power DMRS'. The DMRS information is provided to the UE only when the PDSCH is received. The following three pieces of information are provided to the UE in association with the DMRS.

DMRS information 1: DMRS information for receiving PDSCH addressed to the UE

DMRS information 2: DMRS information for use in interference measurement of UE (interferer DMRS information)

DMRS information 3: DMRS information in order for the eNB to notify the UE whether DMRS is applied or not The DMRS information 1 is the information necessary for the UE to receive PDSCH addressed to it, and includes allocated DMRS ports, the number of allocated DMRS ports, scrambling applied to the DMRS, etc. The DMRS information 2 is the information necessary for the UE to perform interference measurement on the signal transmitted to other UEs, and includes allocated DMRS ports, scrambling applied to DMRS, etc. Such a DMRS allocated to another UE is referred to as an interferer DMRS, and the information related to the interferer DMRS is referred to as Interferer DMRS Information.

In embodiments of the present invention, the interference measurement and DMRS resource allocation is performed based on a plurality of DMRS resources (or a DMRS pattern), as shown in FIG. 10.

In FIG. 10, there are four radio resources capable of being allocated for DMRS (DMRS resources). In order for the UE to receive PDSCH, the DMRS has to be transmitted on at least one DMRS resource. According to the rank supported by the UE, a plurality of DMRS resources may be allocated. For example, although it is enough to allocate one DMRS resource for the UE receiving PDSCH at rank 1, in order for the UE receiving PDSCH at rank 8, two DMRS resources should be allocated to the UE. A plurality of DMRS ports may be mapped to one DMRS resource. One DMRS port is used for acquiring channel estimation information for one spatial layer. One method for mapping a plurality of DMRS ports to one DMRS resource is to assign orthogonal codes to the DMRS ports using an orthogonal code division scheme.

For example, DMRS port 1 and DMRS port 2 may be mapped to DMRS resource 1 and spread with the orthogonal codes [+1, +1] and [+1, −1], respectively, on the time axis. The spread signal is transmitted on the corresponding sub-carrier at the $6^{th}$ and $7^{th}$ OFDM symbols of the DMRS resource 1, and the same signal is repeatedly transmitted on the corresponding subcarrier at the $12^{th}$ and $13^{th}$ OFDM symbols. In FIG. 10, the DMRS ports are mapped to the DMRS sources as follows.

DMRS resource 0: DMRS port 0, DMRS port 1
DMRS resource 1: DMRS port 2, DMRS port 3
DMRS resource 2: DMRS port 4, DMRS port 5
DMRS resource 3: DMRS port 6, DMRS port 7

In order for the eNB to perform accurate interference measurement for other UEs, it is necessary to accurately receive the DMRS transmitted by the corresponding UE. Embodiments of the present invention propose a zero-power DMRS. The zero-power DMRS means muting PDSCH transmission to the UE on specific radio resource when DMRS is transmitted to the UE. The zero-power DMRS is applied in unit of DMRS resource as described with reference to FIG. 10. The UE operating in zero-power DMRS mode assumes that no PDSCH is transmitted to it on the corresponding DMRS resource. The reason for using zero-power DMRS is to improve the accuracy of the interferer DMRS measurement when DMRSs addressed to a plurality of UEs are transmitted on different DMRS resources.

Figure 11:
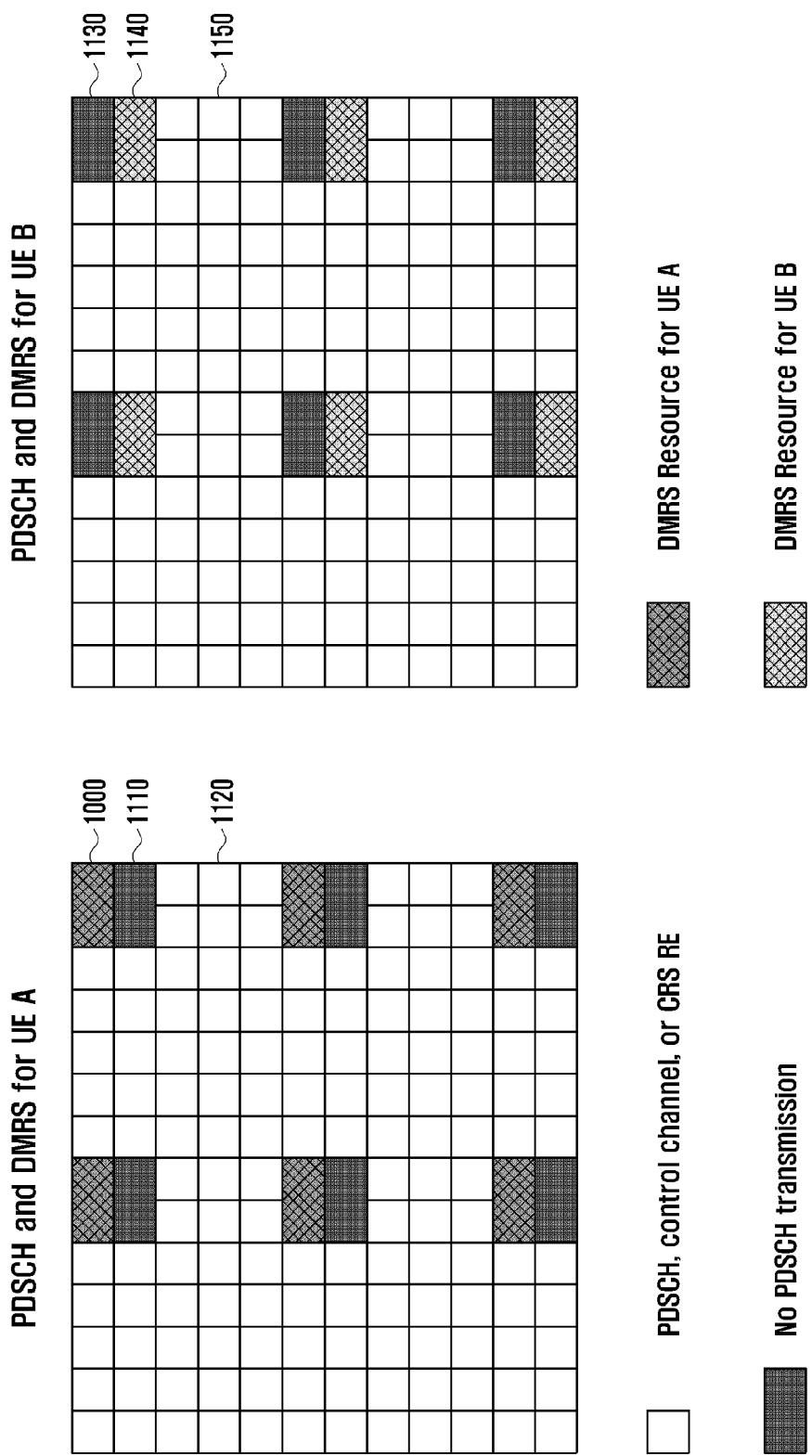
FIG. 11 is a diagram illustrating patterns of zero-power DMRS on a resource block, according to an embodiment of the present invention.

FIG. 11 is a diagram illustrating patterns of zero-power DMRS on a resource block, according to an embodiment of the present invention.

FIG. 11 shows zero-power DMRS patterns in the case that PDSCHs for two UEs are transmitted. In FIG. 11, a UE A receives PDSCH on a PDSCH resource 1120. The UE A also receives DMRS on a DMRS resource 1000 for receiving PDSCH. In contrast, any PDSCH or DMRS for receiving PDSCH addressed to the UE A is not transmitted on a radio resource 1110. Specifically, the zero-power DMRS is mapped to the DMRS resource 1110 for the UE A. Likewise, a UE B receives PDSCH on a PDSCH resource 1150. The UE B receives DMRS on a DMRS resource 1140 for receiving PDSCH. In contrast, any PDSCH addressed to UE B or DMRS for receiving the PDSCH is not transmitted on a DMRS resource 1130. The DMRS resource to which zero-power DMRS for UE A is applied is identical with the DMRS resource to which DMRS for UE B is mapped, and the DMRS resource to which the zero-power DMRS for UE B is mapped is identical with the DMRS resource to which the DMRS for UE A is mapped.

In FIG. 11, the reason for applying zero-power DMRS to the UE A is to improve accuracy of interferer (i.e., UE B) DMRS measurement of the UE A. If the zero-power DMRS is not applied to the UE A, the PDSCH addressed to UE A is transmitted on the DMRS resource 1110. In this case, the PDSCH affects when the UE A measures the interferer DMRS about UE B, resulting in reduction of measurement accuracy. Likewise, if the zero-power DMRS is not applied to the UE B, the PDSCH addressed to UE B is transmitted on the DMRS resource 1130. In this case, the PDSCH affects when the UE B measures the interferer DMRS about UE A.

Whether to apply zero-power DMRS is determined by the eNB. The eNB determines whether to apply zero-power DMRS and notifies the UE of the determination result. The eNB may notify the UE of the determination result through higher layer signaling or physical layer signaling, as described in greater detail below.

In the case of higher layer signaling-based zero-power DMRS notification, the eNB notifies the UE of the tolerable range of zero-power DMRS through higher layer signaling. Specifically, the eNB notifies the UE of the maximum numbers of zero-power DMRSs and PDSCH-reception DMRSs in the DMRS resource. If this information is received, the UE is notified of the maximum range of zero-power DMRS through higher layer signaling and the DMRS transmission duration for receiving PDSCH addressed to it through physical layer signaling. If the zero-power DMRS information and DMRS information are received, the UE may determine the resources allocated for PDSCH, DMRS, and zero-power DMRS. The resource determination procedure is described with reference to FIG. 12.

Figure 12:
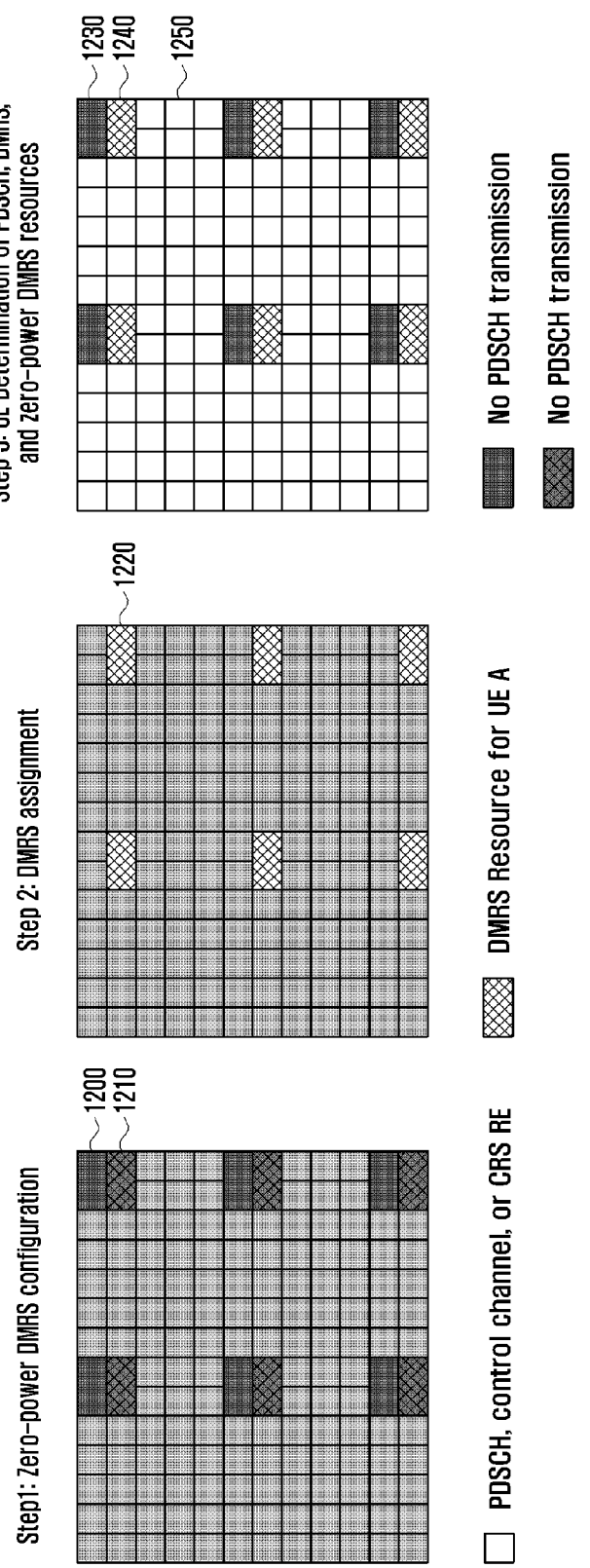
FIG. 12 is a diagram illustrating patterns of DMRS resources available for zero-power DMRS, according to an embodiment of the present invention.

Referring to FIG. 12, the UE receives information on the radio resource region to which zero-power DMRS is applicable through higher layer signaling. FIG. 12 is directed to the case where the eNB notifies the UE of the applicability of zero-power DMRS to DMRS resources 1200 and 1210 through higher layer signaling. The eNB notifies the UE of the transmission of DMRS on the DMRS resource 1220, which is addressed to the UE, through physical layer signaling. If the zero-power DMRS and PDSCH reception DMRS information is received, the UE determines that the desired PDSCH is mapped to a radio resource 1250, the zero-power DMRS is mapped to a radio resource 1230, and the DMRS for receiving PDSCH is mapped to a DMRS resource 1240. Table 2 summarizes the values for control information transmitted from the eNB to the UE in association with the zero-power DMRS.

TABLE 2

| Control information 1 | Zero-power DMRS information |
|---|---|
| 00 | Zero-power DMRS is not applied |
| 01 | Zero-power DMRS is applied to DMRS resources 0 and 1 |
| 10 | Zero-power DMRS is applied to DMRS resources 0, 1, and 2 |
| 11 | Zero-power DMRS is applied to DMRS resources 0, 1, 2, and 3 |

Table 2 is used in a zero-power DMRS resource notification method using higher layer signal control information. If the higher layer signaling control information 1 as defined in Table 2 is received, the UE may check the number of DMRS resources to which zero-power DMRS is applicable. In FIG. 11, since the zero-power DMRS is applicable to one of the two DMRS resources, the UE sends the UE the control information 1 set to '01' through thigh layer signaling. If the control information 1 set to '01' is received, the UE is aware of the number of DMRS resources to which zero-power DMRSs are applied and DMRS resources to which PDSCH is mapped. The DMRS resources to which zero-power DMRS is mapped correspond to the DMRS resources remained after subtracting the PDSCH reception DMRS resources from the DMRS resources indicated by the control information 1. The UE is then capable of discriminating between the DMRS resources to which zero-power DMRS is mapped and the DMRS resources to which the PDSCH is mapped.

In the case of physical layer signaling-based zero-power DMRS notification, the eNB notifies the UE of the radio resource to which the zero-power DMRS is mapped along with PDSCH scheduling information. The PDSCH scheduling information notifies the UE of the radio resource on which the PDSCH is transmitted and, in the LTE/LTE-A system, is carried in PDSCH or E-PDCCH at every subframe. The zero-power DMRS information is transmitted along with the scheduling information because the interference measurement for applying IAD is required only when the UE receives PDSCH. Table 3 summarizes the values for notifying of the zero-power DMRS using the physical layer control information when the PDSCH reception DMRS or zero-power DMRS is mapped to two DMRS resources.

TABLE 3

| Control information 2 | Zero-power DMRS information |
|---|---|
| 00 | Zero-power DMRS is not applied |
| 01 | Zero-power DMRS is applied to DMRS resource 0 |
| 10 | Zero-power DMRS is applied to DMRS resource 1 |
| 11 | Reserved |

Table 3 is used in a zero-power DMRS resource notification method (when two DMRS resources are used) using physical layer control information.

The eNB notifies the UE of whether the zero-power DMRS is applied and, if so, the DMRS resource to which zero-power DMRS is mapped by transmitting zero-power DMRS control information 2 through PDCCH or E-PDCCH. Table 4 summarizes the zero-power DMRS notification method using physical layer control information when the PDSCH reception DMRS and/or zero power DMRS are applied to four DMRS resources.

TABLE 4

| Control information 2 | Zero-power DMRS information |
|---|---|
| 000 | Zero-power DMRS is not applied |
| 001 | Zero-power DMRS is applied to DMRS resource 0 |
| 010 | Zero-power DMRS is applied to DMRS resource 1 |
| 011 | Zero-power DMRS is applied to DMRS resource 2 |
| 100 | Zero-power DMRS is applied to DMRS resource 3 |
| 101 | Zero-power DMRS is applied to DMRS resources 0 and 1 |
| 110 | Zero-power DMRS is applied to DMRS resources 2 and 3 |
| 111 | Reserved |

Table 4 is used in a zero-power DMRS resource notification method (when four DMRS resources are used) using physical layer control information.

In the zero-power DMRS notification method, the eNB notifies the UE of the DMRS resources to which zero-power DMRS is applied. In order for the UE to perform interferer DMRS measurement, it is necessary to notify of the DMRS port of the interferer DMRS allocated to other UEs and the scrambling applied thereto, as well as the DMRS resource to which the interferer DMRS is mapped. The control information may be transmitted by notifying the UE of the related information independently. Specifically, the PDSCH reception DMRS information, zero-power DMRS control information, and interferer DMRS port information may be transmitted independently. This method efficiently transmits the interferer DMRS information from the eNB to the UE, but brings about unnecessary control information bits.

In addition to the method for transmitting the PDSCH reception DMRS control information, zero-power DMRS notification control information, interferer DMRS port control information, and interferer DMRS scrambling control information separately, it may be possible to transmit the pieces of control information as integrated control information. An embodiment of the present disclosure proposes a method for transmitting the interferer DMRS information in the form of integrated control information for transmission efficiency.

FIG. 13 is a diagram illustrating zero-power DMRS and PDSCH reception DMRS patterns that can be allocated to the UE when up to two DMRS resources can be used, according to an embodiment of the present invention.

The eNB supporting up to two DMRS resources is capable of applying at most one zero-power DMRS and at least one PDSCH reception DMRS, as shown in FIG. 13. By taking notice of this characteristic, the eNB's DMRS notification to the UE may be summarized as shown in Table 5.

TABLE 5

| PHY layer control information 2 | support for PDSCH RX DMRS and zero-power DMRS | |
|---|---|---|
| 00 | PDSCH RX DMRS | DMRS source 0 |
| | Zero-power DMRS | Not applied |
| 01 | PDSCH RX DMRS | DMRS resource 0 |
| | Zero-power DMRS | DMRS resource 1 |
| 10 | PDSCH RX DMRS | DMRS resource 1 |
| | Zero-power DMRS | DMRS resource 0 |
| 11 | PDSCH RX DMRS | DMRS resources 0 and 1 |
| | Zero-power DMRS | Not applied |

Table 5 is used in a PDSCH reception DMRS and zero-power DMRS notification method using physical layer control information.

FIG. 14 is a diagram illustrating zero-power DMRS and PDSCH reception DMRS patterns that can be allocated to the UE when up to 4 DMRS resources can be used, according to an embodiment of the present invention. The real system may use some of the four DMRS resources rather than always using all of the four DMRS resources. In the case of using up to 4 DMRS resources, the eNB's DMRS notification to the UE may be summarized as shown in Table 6.

TABLE 6

| PHY layer control information 3 | Support for PDSCH reception DMRS and zero-power DMRS | |
|---|---|---|
| 0000 | PDSCH RX DMRS | DMRS resource 0 |
| | Zero-power DMRS | Not applied |
| 0001 | PDSCH RX DMRS | DMRS resource 0 |
| | Zero-power DMRS | DMRS resource 1 |
| 0010 | PDSCH RX DMRS | DMRS resource 1 |
| | Zero-power DMRS | DMRS resource 0 |
| 0011 | PDSCH RX DMRS | DMRS resources 0 and 1 |
| | Zero-power DMRS | Not applied |
| 0100 | PDSCH RX DMRS | DMRS resource 0 |
| | Zero-power DMRS | DMRS resources 1 and 2 |
| 0101 | PDSCH RX DMRS | DMRS resource 1 |
| | Zero-power DMRS | DMRS resources 0 and 2 |
| 0110 | PDSCH RX DMRS | DMRS resource 2 |
| | Zero-power DMRS | DMRS resources 0 and 1 |
| 0111 | PDSCH RX DMRS | DMRS resources 0 and 1 |
| | Zero-power DMRS | DMRS resource 2 |
| 1000 | PDSCH RX DMRS | DMRS resources 0 and 1 |
| | Zero-power DMRS | DMRS resource 2 |
| 0111 | PDSCH RX DMRS | DMRS resources 0 and 1 |
| | Zero-power DMRS | DMRS resource 2 |
| 1000 | PDSCH RX DMRS | DMRS resource 0 |
| | Zero-power DMRS | DMRS resources 1, 2, and 3 |
| 1001 | PDSCH RX DMRS | DMRS resource 1 |
| | Zero-power DMRS | DMRS resources 0, 2, and 3 |
| 1001 | PDSCH RX DMRS | DMRS resource 2 |
| | Zero-power DMRS | DMRS resources 0, 1, and 3 |
| 1001 | PDSCH RX DMRS | DMRS resource 3 |
| | Zero-power DMRS | DMRS resources 0, 1, and 2 |

TABLE 6-continued

| PHY layer control information 3 | Support for PDSCH reception DMRS and zero-power DMRS | |
|---|---|---|
| 1010 | PDSCH RX DMRS | DMRS resources 0 and 1 |
| | Zero-power DMRS | DMRS resources 2 and 3 |
| 1001 | PDSCH RX DMRS | DMRS resources 2 and 3 |
| | Zero-power DMRS | DMRS resources 0 and 1 |

Table 6 is used in a PDSCH reception DMRS and zero-power DMRS resource notification method using physical layer control information.

When using the control information as shown in Table 6, the eNB may allocate up to four DMRS resources, particularly up to two PDSCH reception DMRS resources and up to three zero-power DMRS resources.

Another method for notifying the UE of the zero-power DMRS resource is to define 1-bit zero-power DMRS control information. In this case, the total number of DMRS resources available at the eNB should be shared between the eNB and the UE in advance. If the 1-bit control information is set to 1, the UE assumes that zero-power DMRS is mapped to the resource that remains after subtracting the DMRS resource allocated for PDSCH reception from all the DMRS resources. If the 1-bit control information is set to 0, the UE assumes that zero-power DMRS is not applied. In an embodiment of the present invention of FIG. 13, where up to two DMRS resources are available, the UE is allocated the DMRS resource 0 for receiving PDSCH and, otherwise if the 1-bit control information is set to 1, assumes that the zero-power DMRS is mapped to the DMRS resource 1. If the UE is allocated the DMRS resource 0 for receiving PDSCH and the 1-bit control information is set to 0, the UE assumes that zero power DMRS is not applied.

In LTE/LTE-A, the PDSCH transmission power is identical with the PDSCH reception DMRS transmission power. The reason for this is to allow the UE to receive the signal in the modulation scheme requiring amplitude reference level, such as 16QAM and 64QAM. Specifically, the UE receives DMRS to check amplitude reference and modulates 16QAM and 64QAM signals using the amplitude reference. For this purpose, a ratio has to be predetermined between the PDSCH transmission power and DMRS transmission power, and the UE has to know the ratio. In LTE/LTE-A, the PDSCH transmission power and the DMRS transmission power maintain the ratio of 1:1.

Figure 15:
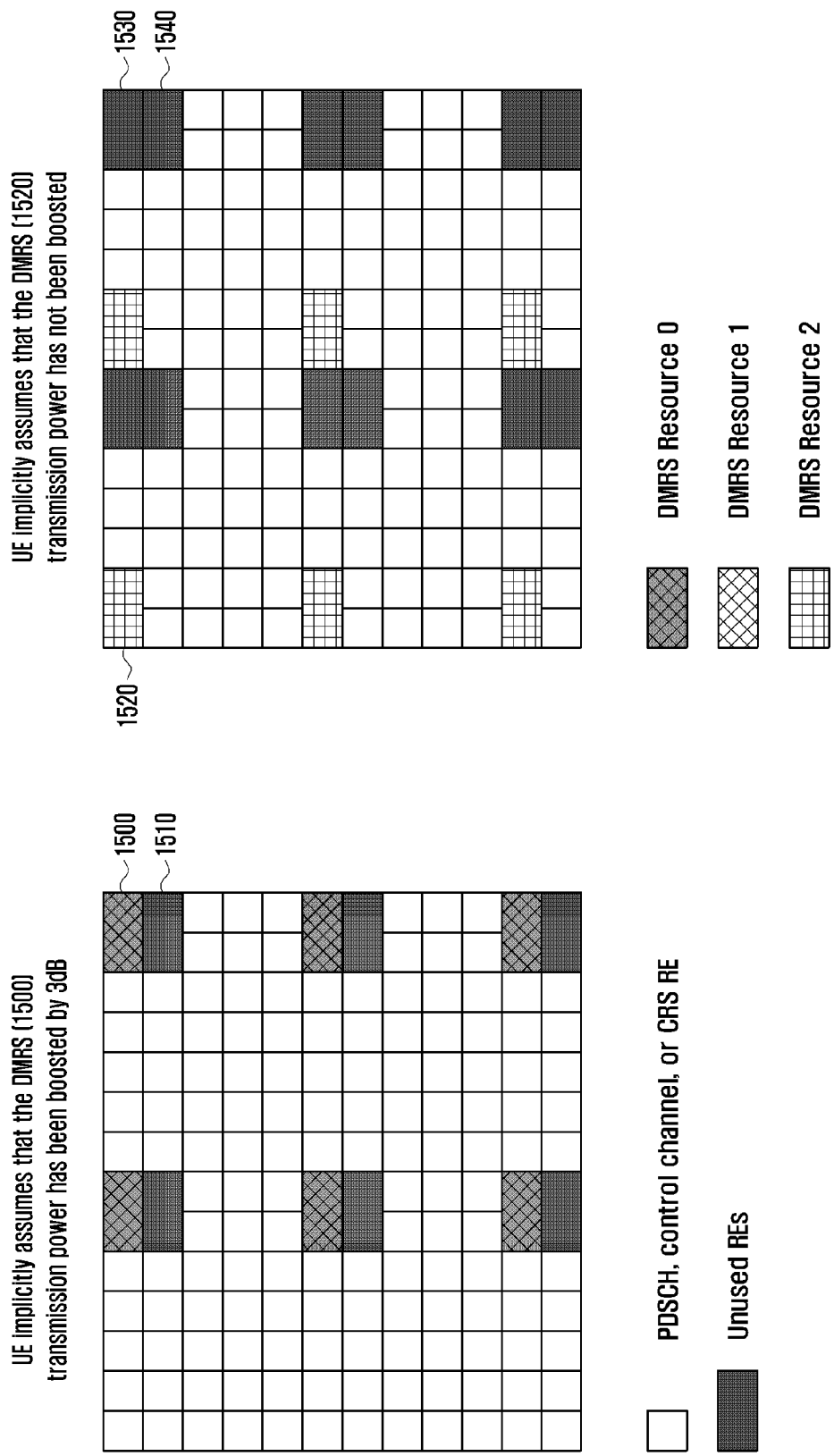
FIG. 15 is a diagram illustrating the DMRS patterns for increasing the transmission power of PDSCH reception DMRS using the transmission power saved due to the application of zero-power DMRS, according to an embodiment of the present invention.

When the zero-power DMRS is applied, the eNB does not transmit PDSCH on predetermined DMRS resource. This means that the PDSCH transmission power is not allocated for PDSCH on the radio resource to which zero-power DMRS is applied. The PDSCH transmit power that is not allocated for PDSCH transmission on the radio resource may be used for another purpose so as to improve the reception performance of the UE. Embodiments of the present invention propose a method of using the transmission power saved due to the application of zero-power DMRS to boost the transmission power of the PDSCH reception DMRS. FIG. 15 is a diagram illustrating the DMRS patterns for increasing the transmission power of PDSCH reception DMRS using the transmission power saved due to the application of zero-power DMRS, according to an embodiment of the present invention.

The left part of FIG. 15 is used in an embodiment where the zero-power DMRS exists in the same OFDM symbol as the PDSCH reception DMRS. The right part of FIG. 15 illustrates another embodiment where the zero-power DMRS exists in an OFDM symbol different from the OFDM symbol in which the PDSCH reception DMRS exists. Since the zero-power DMRS and PDSCH reception DMRS are in the same OFDM symbol in the left part of FIG. 15, the transmit power saved due to the application of zero-power DMRS is used for boosting the transmission power of the PDSCH reception DMRS. If the ratio between the PDSCH transmission power and the DMRS transmission power is 1:1 when the transmission power of the PDSCH reception DMRS is not boosted, the ratio becomes 2:1 after the transmission power of the PDSCH reception DMRS is boosted. Specifically, the transmission power not used on DMRS resource 1510 is used to boost the transmission power of the PDSCH reception DMRS in the same OFDM as much as 3 dB. In the right part of FIG. 15, since the zero-power DMRS and the PDSCH reception DMRS exist in different OFDM symbols 1530, 1540, it is impossible to use the transmission power saved due to the application of zero-power DMRS to boost the transmission power of the PDSCH reception DMRS. This is due to the fact that the transmission power cannot move on the time axis, but instead can move on the frequency axis.

In FIG. 15, the UE may check whether the transmission power of PDSCH reception DMRS is boosted as much as 3 dB based on the zero-power DMRS and PDSCH reception DMRS information without explicit notification from the eNB. Specifically, the UE determines whether the transmission power of PDSCH reception DMRS is boosted as much as 3 dB as follows.

If the PDSCH reception DMRS and the zero-power DMRS exist in the same OFDM symbol, the UE assumes that the PDSCH reception DMRS is transmitted at the transmission power boosted as much as 3 dB.

If the PDSCH reception DMRS and the zero-power DMRS exist in different OFDM symbols, the UE assumes that the PDSCH reception DMRS is transmitted at the same transmission power as PDSCH.

As described above, in order for the UE to demodulate the 16QAM or 64QAM signal, the amplitude reference is required. Accordingly, if the eNB boosts the transmission power of a certain DMRS, this may degrade the reception performance of the UE, and thus, it is necessary to follow a certain rule predetermined between the UE and the eNB.

As shown in FIG. 15, the transmission power saved due to the application of zero-power DMRS may be used to boost the transmission power of the PDSCH in the same OFDM symbol. In this case, it may operate regardless of the OFDM symbol in which the PDSCH reception DMRS is allocated to the UE. Even in the case that the transmission power saved due to the zero-power DMRS is used to boost the transmission power of the PDSCH in the same OFDM symbol, the UE must know the boosted amount of the PDSCH transmission power. In this case, one approach is to assume that the PDSCH transmission power is boosted as much as is predetermined.

In the above description, it is assumed that the transmission power saved due to the application of zero-power DMRS is used to boost the transmission power of the PDSCH on another subcarrier. For example, the saved power is used for boosting the transmission power of PDSCH reception DMRS existing in the same radio resource as much as 3 dB. In this case, the eNB and the UE determine only whether the zero-power DMRS and PDSCH reception DMRS exist in the same time duration without extra information exchange and, if so, assume that the transmission power of the PDSCH reception DMRS is boosted as much as 3 dB. It is also possible for the eNB to notify the UE of the boosted transmission power amount through higher layer signaling. Specifically, if the zero-power DMRS exists in the same time duration as the PDSCH reception DMRS, the eNB notifies the UE that the transmission power of the PDSCH reception DMRS is boosted as much as G dB. If this notification is received, the UE assumes that the transmission power of PDSCH reception DMRS is boosted as much as G dB only when the zero power DMRS and the PDSCH reception DMRS exist in the same time duration. Also, when the zero-power DMRS and the PDSCH reception DMRS exist in the same time duration, the eNB may notify the UE whether the transmission power of PDSCH reception DMRS is boosted or not. When the zero-power DMRS and PDSCH reception DMRS coexist in the same time duration, the eNB sends the UE the 1-bit control information to notify whether the transmission power of PDSCH reception DMRS is boosted. If it is notified that the transmission power of PDSCH reception DMRS is boosted, the UE assumes that the transmission power of PDSCH reception DMRS is boosted as much as a predetermined amount and, otherwise, if no control information is received, assumes that the transmission power of the PDSCH reception DMRS is not boosted.

The information necessary for measuring interfere DMRS for IAD includes interfere DMRS port and scrambling sequence. Typically, one DMRS port is used for transmission one spatial layer for corresponding PDSCH. In the LTE/LTE-A system, it is possible to transmit a plurality of DMRS ports that are assigned orthogonal code division and orthogonal frequency resources to maintain orthogonality each other. Specifically, two different DMRS ports are transmitted using distinct orthogonal codes or distinct frequency resources. For example, in the LTE/LTE-A system, DMRS ports 7 and 8 are transmitted on the DMRS resource 1 with two distinct orthogonal codes. Also, the DMRS ports 9 and 10 are transmitted on the DMRS resource 2 with two distinct orthogonal codes. Scrambling is applied to DMRS for interference randomization between DMRSs transmitted at different transmission timings. The interference randomization minimizes the influence of the interference when the same DMRS port is transmitted at different transmission timings. Accordingly, in order to measure accurate interferer DMRS, the UE has to know the scrambling applied to the interferer DMRS accurately.

In LTE/LTE-A, the scrambling sequence of DMRS is 31-long gold sequence of which a value varies according to the initial state. That is, the initial state value set for the same scrambling sequence generator determines the sequence value to be generated. In LTE/LTE-A, the initial state for scrambling sequence of DMRS is defined as follows in Equation (3):

$$c_{init}=(\lfloor n_s/2 \rfloor+1)\cdot(2X+1)\cdot 2^{16}+n_{SCID} \quad (3)$$

In Equation (3), $n_s$ denotes slot index of an integer value in the range from 0 to 19 and obtained after the UE acquires time synchronization. Since $n_s$ is obtained after acquisition of time synchronization, it is necessary for the UE to obtain X and $n_{SCID}$ as additional information. In Equation (1), X denotes virtual Cell ID having the value in the range from 0 to 503. Also, $n_{SCID}$ has a value of 0 or 1. In LTE/LTE-A, one of preconfigured two X values is determined depending on the $n_{SCID}$ value. If $n_{SCID}$ is 0, X has the value of X(0) preconfigured through higher layer signaling and, if $n_{SCID}$ is 1, X has the value of X(1) preconfigured through higher layer signaling.

The information necessary for the UE to accurately measure the interferer DMRS may be summarized as follows.
- initial state used in DMRS scrambling
- DMRS port index
- DMRS resource index The information necessary for the UE to determine the initial state used in DMRS scrambling may be indicated by which one of the X candidate values is applied to Equation (1). The DMRS port index includes the information on the orthogonal code used for spreading the interferer DMRS and code length. The DMRS resource index includes the information on the radio resource used for transmitting the interferer DMRS. The information necessary for measuring the interferer DMRS may be transmitted individually or integrally. For example, the eNB may notify the UE of the initial state used in DMRS scrambling using separate control information as follows.

TABLE 7

| Initial State control information | Virtual Cell Index: X | $n_{SCID}$ |
|---|---|---|
| 00 | X(0) | 0 |
| 01 | X(1) | 0 |
| 10 | X(2) | 1 |
| 11 | X(3) | 1 |

Table 7 shows an interferer DMRS scrambling initial state control information notification method.

Table 7 summarizes the values of initial state control information under the assumption that X and $n_{SCID}$ are enough to acquire the scrambling information among the variables constituting interferer DMRS scrambling initial state. Even when additional information is required, the eNB may notify the UE of the information using table 7.

Some of the interferer DMRS scrambling initial state control information, interferer DMRS port index, and DMRS resource index may be transmitted to the UE as integrated control information according to the total number of available DMRS resources and Tables 8 and 9.

TABLE 8

| Control information | Interferer DMRS Resource Index | Interferer DMRS port Index |
|---|---|---|
| 00 | DMRS resource 0 | DMRS port 0 (first DMRS port of DMRS resource 0) |
| 01 | DMRS resource 0 | DMRS port 1 (second DMRS port of DMRS resource 0) |
| 10 | DMRS resource 1 | DMRS port 2 (first DMRS port of DMRS resource 1) |
| 11 | DMRS resource 1 | DMRS port 3 (second DMRS port of DMRS resource 1) |

Table 8 is used in an interferer DMRS port and DMRS resource control information notification method (when two DMRS resources are available).

TABLE 9

| Control information | Interferer DMRS Resource Index | Interferer DMRS Port Index |
|---|---|---|
| 000 | DMRS resource 0 | DMRS port 0 (first DMRS port of DMRS resource 0) |
| 001 | DMRS resource 0 | DMRS port 1 (second DMRS port of DMRS resource 0) |
| 010 | DMRS resource 1 | DMRS port 2 (first DMRS port of DMRS resource1) |
| 011 | DMRS resource 1 | DMRS port 3 (second DMRS port of DMRS resource 1) |
| 100 | DMRS resource 2 | DMRS port 4 (first DMRS port of DMRS resource 2) |
| 101 | DMRS resource 2 | DMRS port 5 (second DMRS port of DMRS resource 2) |
| 110 | DMRS resource 3 | DMRS port 6 (first DMRS port of DMRS resource 3) |
| 111 | DMRS resource 3 | DMRS port 7 (second DMRS port of DMRS resource 3) |

Table 9 is used in an exemplary DMRS port and DMRS resource control information notification method (when four DMRS resources are used).

With table 9, it is possible to notify the UE of the PDSCH reception DMRS and DMRS port in the same way as the interferer DMRS resource and DMRS port. In this case, the UE assumes that there is no interferer.

There is another method for notifying of the interferer DMRS port and DMRS resource control information with the PDSCH reception DMRS allocated to the corresponding UE, as shown in table 10.

TABLE 10

| Control information | Interference DMRS Resource Index | Interferer DMRS Port Index |
|---|---|---|
| 000 | DMRS resource I | Other DMRS port of DMRS resource i |
| 001 | DMRS resource (i + 1) mode 4 | $1^{st}$ DMRS port of DMRS resource (i + 1) mode 4 |
| 010 | DMRS resource (i + 1) mode 4 | $2^{nd}$ DMRS port of DMRS resource (i + 1) mode 4 |
| 011 | DMRS resource (i + 2) mode 4 | $1^{st}$ DMRS port of DMRS resource (i + 2) mode 4 |
| 100 | DMRS resource (i + 2) mode 4 | $2^{nd}$ DMRS port of DMRS resource (i + 2) mode 4 |
| 101 | DMRS resource (i + 3) mode 4 | $1^{st}$ DMRS port of DMRS resource (i + 3) mode 4 |
| 110 | DMRS resource (i + 3) mode 4 | $2^{nd}$ DMRS port of DMRS resource (i + 3) mode 4 |
| 111 | No interference to measure | No interference to measure |

Table 10 is used in an exemplary interferer DMRS port and DMRS resource control information notification method.

With table 10, the control information including the interference DMRS resource and DMRS port information is transmitted to the UE. The interferer DMRS resource and DMRS port information is notified based on the PDSCH DMRS resource I and DMRS port j. That is, in the case that the UE is allocated the DMRS port 1 of DMRS resource 0 for PDSCH, if the control information set to '100', as shown in Table 10, is received, the UE determines that the DMRS resource 3 is the interferer DMRS resource and port 6 is the interferer DMRS port. With Table 10, the UE is capable of notifying of the interferer DMRS resource index and DMRS port index based on the PDSCH reception DMRS resource index and DMRS port index so as to reduce the number of bits of control information. When the PDSCH reception DMRS resource index and DMRS port index are not used, an additional control bit is required to notify the UE of the interferer DMRS resource index and DMRS port index, as compared to Table 10.

When using Table 10, if the control information set to '000' is received, the UE assumes that the interferer DMRS is transmitted through the DMRS port, which is not allocated to the UE in the same DMRS resource as the DMRS resource allocated for receiving PDSCH. For example, if the UE that has allocated the DMRS resource 2 and DMRS port 4 for receiving PDSCH receives the control information set to '000', it assumes that the interferer DMRS is transmitted using DMRS resource 2 and DMRS port 5.

Table 10 is directed to the case that the interferer DMRS is transmitted using one of DMRS resources 0, 1, 2, and 3. The notification method based on Table 10 is advantageous in notifying the UE of the DMRS resource on which interferer DMRS is transmitted, but disadvantageous in the amount that the control information increases. In order to overcome this problem, the eNB may restrict the interferer DMRS resource capable of being used for signaling to the UE. For example, the interferer DMRS resource for use in notification is restricted to the DMRS resource in the same OFDM symbol as shown in Table 11. When using Table 11, if the UE is allocated the DMRS resource 2 as the PDSCH reception DMRS, the eNB may notify the UE whether any interferer exists on the DMRS resource 2 or DMRS resource 3. Although this method has a restriction in notifying of the presence/absence of interferer on the DMRS resource in other OFDM symbol, it is advantageous in reducing the amount of control information by 1 bit as compared to the method using Table 10.

TABLE 11

| Control information | DMRS Resource Index | DMRS Port Index |
|---|---|---|
| 00 | DMRS resource i | Other DMRS port of DMRS resource i |
| 01 | DMRS resource i + (−1)$^i$ | 1$^{st}$ DMRS port of DMRS resource i + (−1)$^i$ |
| 10 | DMRS resource i + (−1)$^i$ | 2$^{nd}$ DMRS port of DMRS resource i + (−1)$^i$ |
| 11 | No interference to measure | No interference to measure |

Table 11 is used in an interferer DMRS port and DMRS resource control information notification method.

In addition to the methods using Tables 7, 8, 9, 10, and 11, the DMRS scrambling initial state control information, interferer DMRS port index, and DMRS resource index may be transmitted to the UE as an integrated control information as summarized in Table 12.

TABLE 12

| Control information | DMRS resource index | DMRS port index | Scrambling Initial State |
|---|---|---|---|
| 000 | DMRS resource 0 | DMRS port 0 (1$^{st}$ DMRS port of DMRS resource 0) | Scrambling with same initial state as PDSCH DMRS |
| 001 | DMRS resource 0 | DMRS port 1 (2$^{nd}$ DMRS port of DMRS resource 0) | Scrambling with X(0), $n_{SCID} = 0$ |
| 010 | DMRS resource 1 | DMRS port 2 (1$^{st}$ DMRS port of DMRS resource 1) | Scrambling with X(1), $n_{SCID} = 1$ |
| 011 | DMRS resource 1 | DMRS port 3 (2$^{nd}$ DMRS port of DMRS resource 1) | Scrambling with X(0), $n_{SCID} = 0$ |
| 100 | DMRS resource 2 | DMRS port 4 (1$^{st}$ DMRS port of DMRS resource 2) | Scrambling with X(1), $n_{SCID} = 1$ |
| 101 | DMRS resource 2 | DMRS port 5 (2$^{nd}$ DMRS port of DMRS resource 2) | Scrambling with X(0), $n_{SCID} = 0$ |
| 110 | DMRS resource 3 | DMRS port 6 (1$^{st}$ DMRS port of DMRS resource 3) | Scrambling with X(1), $n_{SCID} = 1$ |
| 111 | DMRS resource 3 | DMRS port 7 (2$^{nd}$ DMRS port of DMRS resource 3) | No interference to measure |

Table 12 is used in an interferer DMRS control information notification method 1.

The control information may be notified to the UE using the PDSCH reception DMRS allocated to the UE, as shown in Table 13.

TABLE 13

| Control information | Interference DMRS Resource Index | DMRS Port Index | Scrambling Initial State |
|---|---|---|---|
| 000 | DMRS resource i | Other DMRS port of DMRS resource i | Scrambling with same initial state as PDSCH DMRS |
| 001 | DMRS resource (i + 1) mode 4 | 1$^{st}$ DMRS port of DMRS resource (i + 1) mode 4 | Scrambling with X(0), $n_{SCID} = 0$ |
| 010 | DMRS resource (i + 1) mode 4 | 2$^{nd}$ DMRS port of DMRS resource (i + 1) mode 4 | Scrambling with X(1), $n_{SCID} = 1$ |
| 011 | DMRS resource (i + 2) mode 4 | 1$^{st}$ DMRS port of DMRS resource (i + 2) mode 4 | Scrambling with X(0), $n_{SCID} = 0$ |
| 100 | DMRS resource (i + 2) mode 4 | 2$^{nd}$ DMRS port of DMRS resource (i + 2) mode 4 | Scrambling with X(1), $n_{SCID} = 1$ |
| 101 | DMRS resource (i + 3) mode 4 | 1$^{st}$ DMRS port of DMRS resource (i + 3) mode 4 | Scrambling with X(0), $n_{SCID} = 0$ |
| 110 | DMRS resource (i + 3) mode 4 | 2$^{nd}$ DMRS port of DMRS resource (i + 3) mode 4 | Scrambling with X(1), $n_{SCID} = 1$ |
| 111 | No interference to measure | No interference to measure | No interference to measure |

Table 13 is used in an interferer DMRS control information notification method 2.

The DMRS scrambling information notified to the UE with Table 13 may be preconfigured through higher layer signaling. Specifically, the X and $n_{SCID}$ values to be linked to control information of Table 13 in association with DMRS scrambling may be preconfigured through higher layer signaling.

In the information notification methods using Tables 10, 11, and 13, the interferer DMRS information is notified based on the DMRS resource i allocated to the UE for use in receiving PDSCH. Although these methods may be applicable to the case where the UE is allocated one DMRS resource for receiving PDSCH, if a plurality of DMRS resources are allocated to the UE for use in receiving PDSCH, it is necessary to predetermine the DMRS resource to be used as reference for checking the interferer DMRS information. When the UE is allocated a plurality of DMRS resources for receiving PDSCH, the proposed methods using Tables 10, 11, and 13 may be applied based on the DMRS resource having one of lowest and highest indices among the plurality of DMRS resources. When the UE is allocated a plurality of DMRS ports for use in receiving PDSCH, the proposed method using Tables 10, 11, and 13 may be applied based on the DMRS port having one of the lowest and highest DMRS port indices among the plural DMRS ports.

Figure 16:
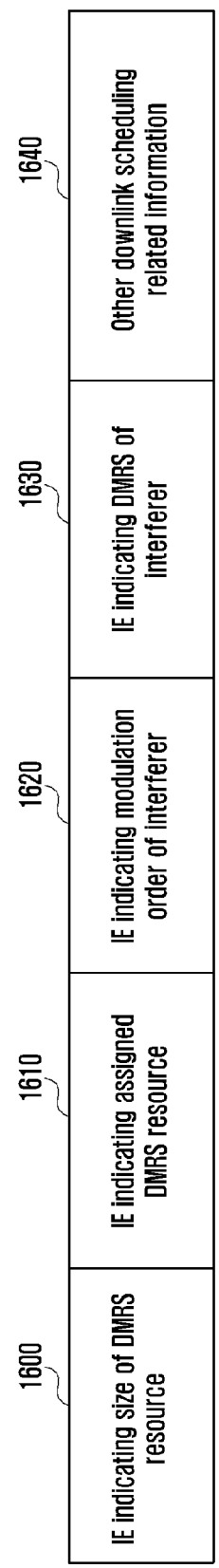
FIG. 16 is a diagram illustrating a format of the scheduling message including control information related to IAD, according to an embodiment of the present invention.

FIG. 16 is a diagram illustrating a format of the scheduling message including control information related to IAD, according to an embodiment of the present invention. The scheduling message is transmitted from the eNB to the UE.

In FIG. 16, reference number 1600 denotes the size of the DMRS resource notified from the eNB to the UE using a table such as Tables 4, 5, and 6. The reference number 1600 also includes information related to the zero-power DMRS. Reference number 1610 denotes the information related to the DMRS for use in receiving PDSCH allocated to the UE. Reference number 1620 denotes the information on the modulation order of the interference signal. Reference number 1630 denotes the information on the interferer DMRS and is notified to the UE with one of the methods using Tables 7, 8, 9, 10, 11, 12, and 13. The control Information Elements (IE) of reference numbers 1600 to 1630 are transmitted to the UE along with PDSCH scheduling information.

Figure 17:
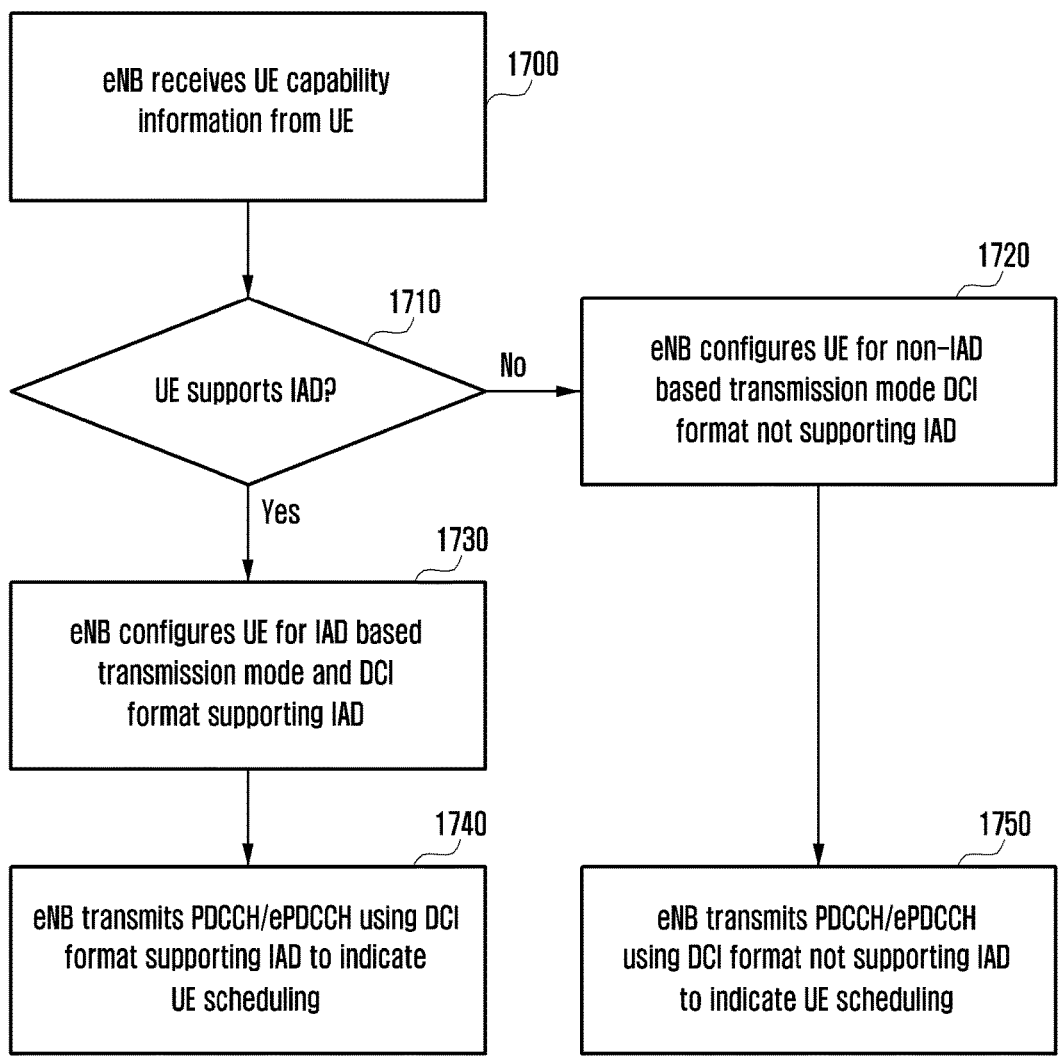
FIG. 17 is a flowchart illustrating an eNB procedure in the IAD method, according to an embodiment of the present invention.

FIG. 17 is a flowchart illustrating an eNB procedure in the IAD method, according to an embodiment of the present invention.

In FIG. 17, the eNB receives the UE capability information from the UE, in step 1700. The eNB determines whether the UE supports IAD based on the UE capability, in step 1710. If the UE does not support IAD, the eNB configures a DCI format that does not support IAD for the UE, in step 1720. The DCI format that does not support IAD does not include control information associated with IAD, which is described with reference to FIG. 16. After configuring the DCI format, the eNB notifies the UE of the control information, including the DCI format which does not support IAD, in step 1750. If it is determined that the UE supports IAD in step 1710, the eNB configures a DCI format supporting IAD for the UE, in step 1730. The DCI format supporting IAD includes control information associated with IAD, as described with reference to FIG. 16. After configuring the DCI format supporting IAD, the eNB notifies the UE of the IAD control information along with other scheduling information using PDCCH or E-PDCCH, in step 1740.

Figure 18:
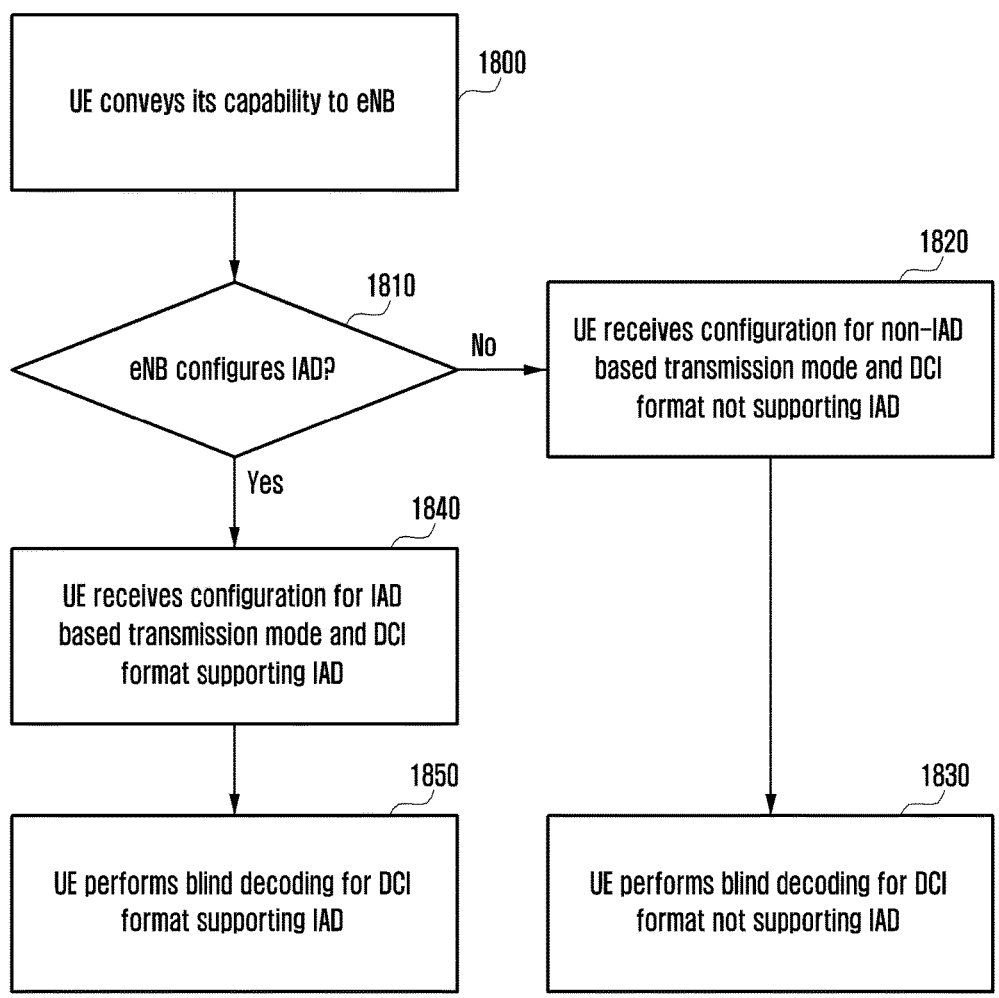
FIG. 18 is a flowchart illustrating a UE procedure in the IAD method, according to an embodiment of the present invention.

FIG. 18 is a flowchart illustrating a UE procedure in the IAD method, according to an embodiment of the present invention.

The UE transmits its capability information to the eNB, in step 1800. The UE capability information indicates whether the UE supports IAD. After transmitting the UE capability information, the UE receives IAD configuration from the eNB. In step 1810, it is determined whether the eNB has configured IAD for the UE. If it is determined that the eNB has not configured IAD for the UE, the UE receives configuration for a non-IAD-based transmission mode and DCI formation not supporting IAD, in step 1820. The UE performs blind decoding for a DCI format that does not support IAD to receive the scheduling control information from the eNB, in step 1830. If it is determined that the eNB has configured IAD for UE in step 1810, the UE receives the configuration for an IAD based transmission mode and a DCI format supporting IAD, in step 1840. The UE performs blind decoding for the DCI format supporting IAD to receive IAD and scheduling control information, in step 1850. Upon receipt of the IAD control information in step 1850, the UE applies IAD when receiving PDSCH based on the IAD control information.

When the UE is configured to apply IAD as described with reference to step 1840 of FIG. 18, the UE receives the control information using the DCI format supporting IAD when receiving PDCCH/ePDCCH. When the UE is configured to apply IAD, there is another change in the downlink channel state information transmitted from the UE to the eNB. The UE sends the eNB the channel state information to which a different assumption is applied depending on whether IAD is configured or not. If IAD is configured, the UE notifies the eNB of the peak reception data rate with the application of IAD. If IAD is not configured, the UE notifies the eNB of the peak reception data rate without application of IAD.

Figure 19:
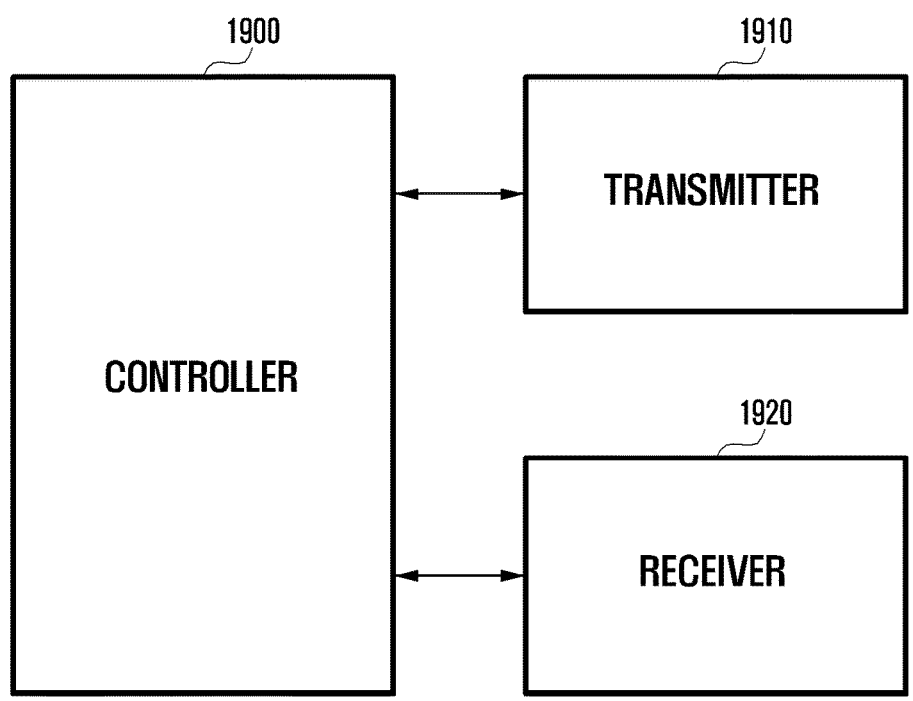
FIG. 19 is a block diagram illustrating a configuration of the eNB supporting IAD, according to an embodiment of the present invention.

FIG. 19 is a block diagram illustrating a configuration of the eNB supporting IAD, according to an embodiment of the present invention.

In FIG. 19, a controller 1900 of the eNB determines IAD configuration and PDSCH scheduling for the UE. The IAD configuration for the UE is provided to the UE by means of a transmitter 1910. According to the PDSCH scheduling decision of the eNB, PDCCH/ePDCCH is transmitted to the UE by means of the transmitter 1910. The eNB receives the channel state information reported according to the PDSCH transmission and IAD configuration of the UE by means of a receiver 1920.

In more detail, the controller 1900 checks whether the UE supports IAD and, if the UE supports IAD, generates control information including interference signal modulation scheme and demodulation reference signal measurement information. The controller 1900 transmits the control information by means of the transmitter 1910.

The modulation scheme information may consists of bits indicating at least one modulation scheme corresponding to an interference signal and indicating that the interference signal is not modulated in any specific modulation scheme. Particularly the information, indicating the interference signal is not modulated in any specific modulation scheme, is configured when there is no significant interference signal to the UE, when the interference signal is not modulated in specific modulation scheme, or when the interference signal appears at a part of the frequency band of the received signal.

The demodulation reference signal measurement information may include demodulation reference signal information for the UE to receive data channel, interferer demodulation reference signal information for the UE to measure interference, and zero-power demodulation reference signal information. The zero-power demodulation reference signal information is transmitted to the UE through higher layer signaling or physical layer signaling.

According to an embodiment of the present invention, if the zero-power demodulation reference signal is used for the UE, the controller 1900 of the eNB determines whether the zero-power demodulation reference signal and data channel reception demodulation reference signal exist in the same symbol. If the zero-power demodulation reference signal and data channel reception demodulation reference signal exist in the same symbol, the controller of the eNB uses the transmission power saved due to the application of the zero-power demodulation reference signal to boost the transmission power of the data channel reception demodulation reference signal.

The interference demodulation reference signal information may include at least one of an initial state of scrambling of the demodulation reference signal, a demodulation reference signal port index, and a demodulation reference signal resource index and be transmitted to the eNB in various methods.

Figure 20:
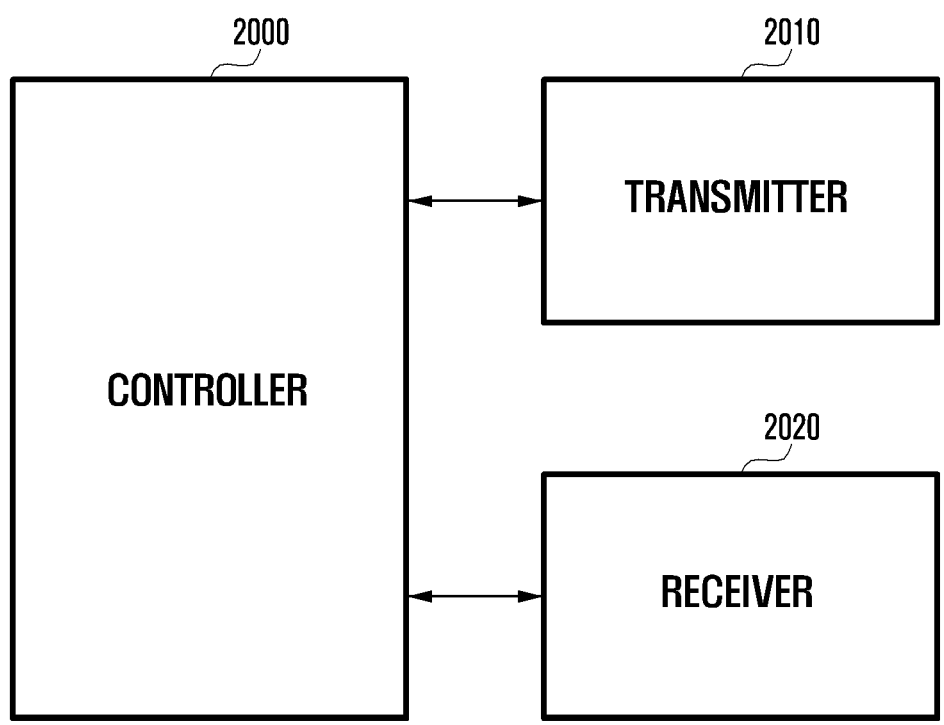
FIG. 20 is a block diagram illustrating a configuration of the UE supporting IAD, according to an embodiment of the present invention.

FIG. 20 is a block diagram illustrating a configuration of the UE supporting IAD, according to an embodiment of the present invention.

In FIG. 20, a controller 2000 of the UE receives the control information including IAD configuration from the eNB by means of a receiver 2020 to check the radio resource for use in interference measurement. The receiver 2020 performs decoding on PDCCH/ePDCCH such that the controller 2000 is able to check the schedule of PDSCH. The UE extracts the IAD control information from the information received through PDCCH/E-PDCCH.

In more detail, a transmitter 2010 of the UE sends the eNB the UE capability information indicating whether the UE supports IAD. If the UE supports IAD, the receiver 2020 of the UE receives the control information including interference signal modulation scheme for the UE and modulation reference signal measurement information. The controller 2000 controls the UE to measure the interference to the UE based on the received control information.

According to various embodiments of the present invention, it is possible to improve the downlink signal reception performance of the UE.

As described above, the interference-aware detection method and apparatus of embodiments of the present invention are capable of improving reception performance of the UE in a wireless communication system.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for transmitting control information, for interference detection by a User Equipment (UE), in base station of a wireless communication system, the method comprising:
    receiving capability information of the UE, the capability information indicating whether the UE supports interference-aware detection;
    determining whether the UE supports the interference-aware detection based on the capability information;
    when the UE supports interference-aware detection, generating the control information comprising demodulation reference signal measurement information; and
    transmitting the control information to the UE,
    wherein the demodulation reference signal measurement information includes information on a demodulation reference signal for transmitting data to the UE, information on an interferer demodulation reference signal, and information on a zero-power demodulation reference signal,
    wherein data transmission to another UE is performed using the interferer demodulation reference signal, and
    wherein the interferer demodulation reference signal is measured using the information on the zero-power demodulation reference signal, which indicates muting data transmission on a resource of the zero-power demodulation reference signal.

2. The method of claim 1, wherein the information on the zero-power demodulation reference signal is transmitted to the UE through one of higher layer signaling and physical layer signaling.

3. The method of claim 2, further comprising:
    when the zero-power demodulation reference signal is applied to the UE, determining whether the zero-power demodulation reference signal exists in a same symbol as the demodulation reference signal for transmitting the data; and
    when the zero-power demodulation reference signal exists in the same symbol as the demodulation reference signal for receiving the data, boosting a transmission power of the demodulation reference signal for transmitting the data with a transmission power saved by the zero-power demodulation reference signal.

4. The method of claim 1, wherein the information on the interferer demodulation reference signal comprises at least one of an initial state used in scrambling the interferer demodulation reference signal, a demodulation reference signal port index, and a demodulation reference signal resource index of the interferer demodulation reference signal.

5. The method of claim 1, wherein the control information further comprises interference signal modulation scheme information.

6. The method of claim 5, wherein the interference signal modulation scheme information comprises at least one modulation scheme applied to an interference signal and an indicator for indicating that the interference signal is not modulated in any modulation scheme.

7. The method of claim 6, wherein the indicator is configured when a strength of the interference signal to the UE is less than a predetermined level, when the interference signal is modulated in a specified modulation scheme, or when the interference signal exists at a part of a frequency band of a desired signal.

8. A base station for transmitting control information for a User Equipment (UE) to detect interference in a wireless communication system, the base station comprising:
    a transceiver configured to transmit and receive signals to and from the UE; and
    a controller configured to receive capability information of the UE, the capability information indication whether the UE supports interference-aware detection, determine whether the UE supports the interference-aware detection based on the capability information, generate the control information comprising demodulation reference signal measurement information when the UE supports the interference-aware detection, and control the transceiver to transmits the control information to the UE,
    wherein the demodulation reference signal measurement information includes information on a demodulation reference signal for transmitting to the UE, information on an interferer demodulation reference signal, and information on a zero-power demodulation reference signal,
    wherein data transmission to another UE is performed using the interferer demodulation reference signal, and
    wherein the interferer demodulation reference signal is measured using the information on the zero-power demodulation reference signal, which indicates muting data transmission on a resource of the zero-power demodulation reference signal.

9. The base station of claim 8, wherein the information on the zero-power demodulation reference signal is transmitted to the UE through one of higher layer signaling and physical layer signaling.

10. The base station of claim 9, wherein the controller determines whether the zero-power demodulation reference signal exists in a same symbol as the demodulation reference signal for transmitting the data when the zero-power demodulation reference signal is applied to the UE, and boosts a transmission power of the demodulation reference signal for transmitting the data with a transmission power saved by the zero-power demodulation reference signal when the zero-power demodulation reference signal exists in the same symbol as the demodulation reference signal for transmitting the data.

11. The base station of claim 8, wherein the information on the interferer demodulation reference signal comprises at least one of an initial state used in scrambling the interferer demodulation reference signal, a demodulation reference signal port index, and a demodulation reference signal resource index of the interferer demodulation reference signal.

12. The base station of claim 8, the control information further comprises interference signal modulation scheme information.

13. The base station of claim 12, wherein the interference signal modulation scheme information comprises at least one modulation scheme applied to an interference signal and an indicator for indicating that the interference signal is not modulated in any modulation scheme.

14. The base station of claim 13, wherein the indicator is configured when strength of the interference signal to the UE is less than a predetermined level, when the interference signal is not modulated in a specified modulation scheme, or when the interference signal exists at a part of a frequency band of a desired signal.

15. A method for receiving control information for detecting interference in a User Equipment (UE) of a wireless communication system, the method comprising:
   transmitting capability information of the UE, the capability information indicating whether the UE supports interference-aware detection;
   when the UE supports the interference-aware detection, receiving the control information comprising demodulation reference signal measurement information, the control information being generated based on the capability information; and
   measuring the interference based on the received control information,
   wherein the demodulation reference signal measurement information includes information on a demodulation reference signal for the UE used for receiving data, information on an interferer demodulation reference signal, and information on a zero-power demodulation reference signal,
   wherein data transmission to another UE is performed using the interferer demodulation reference signal, and
   wherein the interferer demodulation reference signal is measured using the information on the zero-power demodulation reference signal, which indicates muting data transmission on a resource of the zero-power demodulation reference signal.

16. The method of claim 15, wherein the information on the zero-power demodulation reference signal is transmitted to the UE through one of higher layer signaling and physical layer signaling.

17. The method of claim 15, wherein the information on the interferer demodulation reference signal comprises at least one of an initial state used in scrambling the demodulation reference signal, a demodulation reference signal port index, and a demodulation reference signal resource index of the interferer demodulation reference signal.

18. The method of claim 15, wherein the control information further comprises interference signal modulation scheme information.

19. The method of claim 18, wherein the interference signal modulation scheme information comprises at least one modulation scheme applied to an interference signal and an indicator for indicating that the interference signal is not modulated in any modulation scheme.

20. The method of claim 19, wherein the indicator is configured when a strength of the interference signal to the UE is less than a predetermined level, when the interference signal is not modulated in a specified modulation scheme, or when the interference signal exists at a part of a frequency band of a desired signal.

21. A User Equipment (UE) for receiving control information from a base station in a wireless communication system, the UE comprising:
   a transceiver configured to transmit and receive signals to and from the base station; and
   a controller configured to transmit capability information of the UE, the capability information indicating whether the UE supports the interference-aware detection, the control information being generated based on the capability information, receive the control information comprising demodulation reference signal measurement information when the UE supports the interference-aware detection, and measure the interference at the UE based on the received control information,
   wherein the demodulation reference signal measurement information includes information on a demodulation reference signal for the UE used for receiving data, information on an interferer demodulation reference signal, and information on a zero-power demodulation reference signal,
   wherein data transmission to another UE is performed using the interferer demodulation reference signal, and
   wherein the interferer demodulation reference signal is measured using the information on the zero-power demodulation reference signal, which indicates muting data transmission on a resource of the zero-power demodulation reference signal.

22. The UE of claim 21, wherein the information on the zero-power demodulation reference signal is transmitted to the UE through one of higher layer signaling and physical layer signaling.

23. The UE of claim 21, wherein the information on the interferer demodulation reference signal comprises at least one of an initial state used in scrambling the interferer demodulation reference signal, a demodulation reference signal port index, and a demodulation reference signal resource index of the interferer demodulation reference signal.

24. The UE of claim 21, the control information further comprises interference signal modulation scheme information.

25. The method of claim 24, wherein measuring the interference comprises:
   measuring an interference signal on respective frequency bands; and
   generating a Log Likelihood Ratio (LLR) on the frequency bands using an interference signal modulation scheme included in the interference signal modulation scheme information of the control information.

26. The UE of claim 24, wherein the interference signal modulation scheme information comprises at least one modulation scheme applied to an interference signal and an indicator for indicating that the interference signal is not modulated in any modulation scheme.

27. The UE of claim 26, wherein the indicator is configured when strength of the interference signal to the UE is less than a predetermined level, when the interference signal is modulated in a specified modulation scheme, or when the interference signal exists at a part of a frequency band of a desired signal.

28. The UE of claim 24, wherein the controller measures an interference signal on respective frequency bands, and generates a Log Likelihood Ratio (LLR) on the frequency bands using an interference signal modulation scheme included in the interference signal modulation scheme information of the control information.

* * * * *